(12) United States Patent
Akiyama

(10) Patent No.: US 8,520,981 B2
(45) Date of Patent: Aug. 27, 2013

(54) DOCUMENT RETRIEVAL OF FEATURE POINT GROUPS USING A GEOMETRICAL TRANSFORMATION

(75) Inventor: Tatsuo Akiyama, Tokyo (JP)

(73) Assignee: NEC Corporation, Tokyo (JP)

( * ) Notice: Subject to any disclaimer, the term of this patent is extended or adjusted under 35 U.S.C. 154(b) by 460 days.

(21) Appl. No.: 12/734,559

(22) PCT Filed: Nov. 10, 2008

(86) PCT No.: PCT/JP2008/070440
§ 371 (c)(1),
(2), (4) Date: May 7, 2010

(87) PCT Pub. No.: WO2009/060975
PCT Pub. Date: May 14, 2009

(65) Prior Publication Data
US 2010/0239172 A1    Sep. 23, 2010

(30) Foreign Application Priority Data
Nov. 8, 2007    (JP) .................................. 2007-291352

(51) Int. Cl.
*G06K 9/00*    (2006.01)
(52) U.S. Cl.
USPC ............................ 382/305; 382/190; 382/294
(58) Field of Classification Search
None
See application file for complete search history.

(56) References Cited

U.S. PATENT DOCUMENTS

| | | | |
|---|---|---|---|
| 5,978,620 A | 11/1999 | Syeda-Mahmood | |
| 2003/0219147 A1 | 11/2003 | Nishiura | |
| 2007/0179921 A1* | 8/2007 | Zitnick et al. | 706/20 |
| 2010/0296736 A1* | 11/2010 | Shiiyama et al. | 382/195 |

FOREIGN PATENT DOCUMENTS

| | | |
|---|---|---|
| JP | 2000-36897 | 2/2000 |
| JP | 2001-92963 | 4/2001 |
| JP | 2003-346157 | 12/2003 |
| JP | 2006-309718 | 11/2006 |
| JP | 2007-140823 | 6/2007 |
| WO | WO 2006/092957 A1 | 9/2006 |

OTHER PUBLICATIONS

Zitnick et al. (Apr. 2007) "Object instance recognition using triplets of feature symbols." Microsoft Research Technical Report MSR-TR-2007-53.*

(Continued)

*Primary Examiner* — Barry Drennan
(74) *Attorney, Agent, or Firm* — McGinn IP Law Group, PLLC

(57) ABSTRACT

The arrangements of feature points are computed based on feature points acquired from checking target images. The feature amount having invariants as elements regarding a geometrical transformation is generated for each of the checking target images based on a computed result. And when checking whether or not the feature point arrangements of the checking target images are the same feature point arrangements by using the feature point amounts of the checking target images, at least each of the feature point arrangements that are bases for generating the feature amounts is stored, and a parameter regarding the geometrical transformation is computed based on the feature point arrangements of the checking target images. By utilizing the computed parameter regarding the geometrical transformation, whether or not the feature point arrangements of the checking target images are the same feature point arrangements is checked.

21 Claims, 38 Drawing Sheets

(56) References Cited

OTHER PUBLICATIONS

Tomohiro Nakai et al., "Use of Affine Invariants and Similarity Invariants in Fast Camera-based document Image Retrieval", Technical report of IEICE, (Pattern Recognition/ Media Understanding, PRMU-184-201), Feb. 16, 2006, pp. 25-30 (1-6).

Tomohiro Nakai et al., "Real-Time Document Image Retrieval Based on Local Arrangements of Feature Points and Its Application to Augmented Reality", Information Processing Society of Japan Kenkyu Hokoku, Sep. 8, 2006, vol. 2006, No. 93, pp. 41 to 48.

Kazuto Noguchi et al., "Experimental Investigation of Relation Between Near Neighbor Search Methods for Feature Vectors and Efficiency of Object Recognition", IEICE Technical Report, Sep. 1, 2006, vol. 106, No. 229, pp. 57 to 64.

* cited by examiner

FIG. 10

REGISTERED IMAGE RI1 abcd
efgh

REGISTERED IMAGE RI2

FIG. 12

SEARCH IMAGE QI abcd
efgh

FIG. 14

REGISTERED IMAGE RI1

| FEATURE POINT NUMBER | X-COORDINATE | Y-COORDINATE |
|---|---|---|
| 1 | 183.342... | 47.829... |
| 2 | 84.386... | 52.589... |
| 3 | 133.333... | 59.969... |
| 4 | 226.236... | 56.194... |
| 5 | 86.073... | 146.678... |
| 6 | 129.607... | 151.626... |
| 7 | 181.168... | 148.989... |
| 8 | 233.235... | 151.584... |

FIG. 15

| rpid | rdid | v0 | v1 | ... | v14 | id1 | id2 | id3 | id4 | id5 | id6 |
|---|---|---|---|---|---|---|---|---|---|---|---|
| 1 | | | | | | | | | | | |

NFP(1)=8

NRDID(1,1)=7

| rpid | rdid | v0 | v1 | ... | v14 | id1 | id2 | id3 | id4 | id5 | id6 |
|---|---|---|---|---|---|---|---|---|---|---|---|
| 3 | 0 | 0.39821 | 0.29439 | ... | 2.01671 | 2 | 5 | 6 | 8 | 4 | 1 |
| 3 | 1 | | | | | | | | | | |
| 1 | | | | | | | | | | | |

NRDID(1,3)=7

| rpid | rdid | v0 | v1 | ... | v14 | id1 | id2 | id3 | id4 | id5 | id6 |
|---|---|---|---|---|---|---|---|---|---|---|---|
| 8 | | | | | | | | | | | |

NRDID(1,8)=7

FIG. 16

M FEATURE POINT COMBINATION={w1,w2,w3,w4,w5,w6}

| FEATURE VECTOR ELEMENT NUMBER | $fv_1$ FEATURE POINT NUMBER | $fv_2$ FEATURE POINT NUMBER | $fv_3$ FEATURE POINT NUMBER | $fv_4$ FEATURE POINT NUMBER |
|---|---|---|---|---|
| 0 | w1 | w2 | w3 | w4 |
| 1 | w1 | w2 | w3 | w5 |
| 2 | w1 | w2 | w3 | w6 |
| 3 | w1 | w2 | w4 | w5 |
| 4 | w1 | w2 | w4 | w6 |
| 5 | w1 | w2 | w5 | w6 |
| 6 | w1 | w3 | w4 | w5 |
| 7 | w1 | w3 | w4 | w6 |
| 8 | w1 | w3 | w5 | w6 |
| 9 | w1 | w4 | w5 | w6 |
| 10 | w2 | w3 | w4 | w5 |
| 11 | w2 | w3 | w4 | w6 |
| 12 | w2 | w3 | w5 | w6 |
| 13 | w2 | w4 | w5 | w6 |
| 14 | w2 | w4 | w5 | w6 |

FIG. 17

REGISTERED IMAGE RI2

| FEATURE POINT NUMBER | X-COORDINATE | Y-COORDINATE |
|---|---|---|
| 1 | 272.185... | 77.159... |
| 2 | 74.273... | 86.678... |
| 3 | 172.166... | 101.439... |
| 4 | 357.972... | 93.889... |
| 5 | 77.646... | 274.856... |
| 6 | 164.714... | 284.753... |
| 7 | 267.836... | 279.479... |
| 8 | 371.971... | 284.668... |

FIG. 19

| NFP(2)=8 | | | | | | | | | | |
|---|---|---|---|---|---|---|---|---|---|---|
| NRDID(2,1)=7 | | | | | | | | | | |
| rpid | rdid | v0 | v1 | ... | v14 | id1 | id2 | id3 | id4 | id5 | id6 |
| 1 | ... | ... | ... | ... | ... | ... | ... | ... | ... | ... | ... |

| NRDID(2,3)=7 | | | | | | | | | | |
|---|---|---|---|---|---|---|---|---|---|---|
| rpid | rdid | v0 | v1 | ... | v14 | id1 | id2 | id3 | id4 | id5 | id6 |
| 3 | 0 | ... | ... | ... | ... | ... | ... | ... | ... | ... | ... |
| 3 | 1 | 0.39821 | 0.29439 | ... | 2.01671 | 2 | 5 | 6 | 8 | 4 | 1 |
| 3 | ... | ... | ... | ... | ... | ... | ... | ... | ... | ... | ... |

| NRDID(2,8)=7 | | | | | | | | | | |
|---|---|---|---|---|---|---|---|---|---|---|
| rpid | rdid | v0 | v1 | ... | v14 | id1 | id2 | id3 | id4 | id5 | id6 |
| 8 | ... | ... | ... | ... | ... | ... | ... | ... | ... | ... | ... |

FIG. 20

SEARCH IMAGE QI

| FEATURE POINT NUMBER | X-COORDINATE | Y-COORDINATE |
|---|---|---|
| 1 | 132.342... | 87.829... |
| 2 | 33.386... | 92.589... |
| 3 | 82.333... | 99.969... |
| 4 | 175.236... | 96.194... |
| 5 | 35.073... | 186.678... |
| 6 | 78.607... | 191.626... |
| 7 | 130.168... | 189.989... |
| 8 | 182.235... | 191.584... |

DOCUMENT RETRIEVAL OF FEATURE POINT GROUPS USING A GEOMETRICAL TRANSFORMATION

TECHNICAL FIELD

The present invention relates to a feature point arrangement checking device, an image checking device, and a method as well as a program used therefor, with which a collation result can be obtained with high precision and at a high speed in a case where changes between the collated images can be assumed as being in a geometrical transformation and the range of the changes is already known or can be estimated.

BACKGROUND ART

Non-Patent Document 1 discloses an image checking method that utilizes a widely-used feature point arrangement checking method and a widely-used feature point arrangement checking device. Non-Patent Document 1 shows a case where the image checking device is provided for image searching in a document written in English.

Widely-used image checking processing can be divided into two kinds of processing such as registering processing and checking processing. Each of the processing will be described in detail.

In the registering processing, following processing is executed for each of a plurality of images that are registered in advance. First, when one of the registered images is inputted to a registered image feature point extracting module, the centroids of word regions in an English document are extracted as feature points.

Then, combinations of the feature points with the order are computed from the extracted feature points, and an arrangement of a plurality of feature points is computed. Specifically following processing is executed. (A) First, one of the registered images is taken out. (B) Then, one of the plurality of feature points, i.e., a feature point p, is extracted. Then, n-numbers of neighborhood feature points of the feature point p are extracted. (C) Thereafter, m-points are extracted from the n-number of neighboring feature points of the feature point p. (D) Then, a proper single feature point is selected as p0 from the extracted m-points, and the m-points are arranged clockwise by having the feature point p as the center and the feature point p0 as the head to generate a line Lm of the feature points. (E) Subsequently, all lines Lf of the feature points which select f-point are obtained from the line Lm of the feature points by saving the order, and those are arranged in order as in dictionaries. The action of (A) described above is continued for all the registered images, the action of (B) described above is continued until all the feature points are selected as the feature point p, and the action of (C) described above is continued for the combinations of all of the m-number of features points acquired from the n-number of feature points. Therefore, normally, acquired are a great number of lines of the feature points.

Further, an invariant line is computed from the line Lf of the feature points. As shown in FIG. 38, the computed invariant is stored as a feature amount list along with the number (referred to as a registered image number hereinafter) which uniquely designates the registered image and a feature point number (referred to as the feature point number hereinafter) which uniquely designates the feature point. The stored feature amount list is used for the checking processing that is executed in a latter stage. Non-Patent Document 1 proposes a method which stores the feature amount list by using a hash after executing discretization of the invariant in order to speed up searching. However, this proposal is irrelevant to the present invention, so that explanations thereof are omitted herein.

In the checking processing, first, when a search image is inputted, the centroids of the word regions in the English document are extracted as the feature points.

Then, a combination of the feature points with the order is computed from the extracted feature points, and an arrangement of the feature points is acquired by circulating the combination. Specifically, following processing is executed. (A) First, one of the registered images is taken out. (B) Then, one of the feature points of the registered image is extracted as a feature point p, and n-number of neighborhood feature points of the feature point p are extracted. (C) Thereafter, m-number of feature points are extracted from the n-number of neighborhood feature points of the feature point p. (D) Then, a proper single feature point is selected as p0 from the extracted m-number of feature points, and the m-number of feature points are arranged clockwise by having the feature point p as the center and the feature point p0 as the head to generate a line Lm of the feature points. (E) Subsequently, all lines Lf of the feature points which select f-point are obtained from the line Lm of the feature points by saving the order, and those are arranged in order as in dictionaries. The action of (A) described above is continued for all the search images, the action of (B) described above is continued until all the feature points are selected as the feature point p, the action of (C) described above is continued for the combinations of all of the M-number of feature points acquired from the N-number of feature points, and the action of (D) is continued until all of the m-number of feature points are selected as the feature point p0. Therefore, normally, acquired are a great number of lines of the feature points. This processing is the same processing executed for computing the feature point arrangement in the registering processing except that the action of (D) described above is continued until all of the m-number of feature points are selected as the feature point p0.

Further, an invariant line is computed from the line Lf of the feature points. The computed invariant line is collated with the invariant line in the feature amount list stored in the registering processing. When it is found as a result of the collation that the invariant lines match with each other, a coincident number (vote number) for the registered image number in the feature amount list is incremented (voted) by 1. Non-Patent Document 1 proposes other processing for preventing mis-corresponding of invariant lines. However, that proposes is irrelevant to the present invention, so that explanations thereof are omitted herein.

At last, the scores of each registered image are computed from the coincident number for each registered image (vote number acquired from the result voted for each registered image) by using a following computing equation, and the registered image having the maximum score is outputted as the checking result.

$$S(d_i) = V(d_i) - cN(d_i)$$

Note here that $d_i$ is the registered image number, $V(d_i)$ is the number of votes for the registered image whose registered image number is $d_i$, $N(d_i)$ is the number of feature points contained in the registered image whose registered image number is $d_i$, and $c$ is a proportionality constant of the feature point number and the mis-vote defined in a preparatory experiment.

The value of f when executing the registering processing and the checking processing varies depending on the types of transformation tolerated between the registered image and the search image. Non-Patent Document 1 proposes a method which uses an affine invariant computed from f=4 points to allow the affine invariant between the registered image and the search image, for example. When there is an arbitrary affine transformation between two images, the affine invariant is characterized to take a same value from a combination of corresponding points. Therefore, even if there is a change in the shapes due to the arbitrary affine transformation generated between the registered image and the search image, the lines of the invariants computed respectively from the feature point arrangement acquired from the registered image and the feature point arrangement acquired from the corresponding search image becomes the same theoretically through conducting collation by using the feature amounts acquired with the affine invariants. As a result, the feature point checking device that uses the affine invariant as the invariant and the image checking device that uses the feature point checking device can conduct highly precise checking, when it is considered that the transformation between the registered image and the search image can be expressed with the affine transformation.

Further Patent Document 1 discloses a method which checks a single registered image with a plurality of images that are inputted in time series.

Non-Patent Document 1: Tomohiro NAKAI, et al., "Use of Affine Invariants and Similarity Invariants in Fast Camera-based Document Image Retrieval", Technical Report of IEICE (Pattern Recognition/Media Understanding, PRMU-184-201), Feb. 16, 2006, pp. 25-30

Patent Document 1: Japanese Unexamined Patent Publication 2006-309718

DISCLOSURE OF THE INVENTION

Problems to be Solved by the Invention

A first issue is that the feature point arrangement checking device of Non-Patent Document 1 cannot conduct collation of the arrangements of the feature points by considering limitations even in a case where the range of changes between the registered image and the search image can be limited in advance based on the specifications of the imaging systems for capturing the images to be collated, the conditions for capturing the images, and the like.

The reason is that the feature point arrangement checking device using the affine invariant conducts collation by using an invariant regarding an arbitrary affine transformation, so that the checking device misjudges a combination of invariant lists that never correspond under the actual image capturing conditions as being in a corresponding relation. For example, in a case where the registered image and the search image are captured by the imaging devices of the same imaging specifications under the same condition, it cannot be considered that two images are the same when one of the images is enlarged twice as large as the other image. However, double enlargement is one of the affine transformation, so that the same invariants are computed theoretically. Therefore, with the feature point arrangement checking device using only the invariants, the two images are misjudged as being in a corresponding relation. Similarly, in a case where feature point arrangements that can be transformed with the affine transformation are accidentally obtained between a registered image and a search image even though those are not supposedly correspond with each other, the two images are also misjudged as being in a corresponding relation.

A second issue is that the image checking device to which the feature point arrangement checking device of Non-Patent Document 1 is applied cannot conduct checking the images by considering limitations even in a case where the range of changes between the registered image and the search image can be limited in advance based on the specifications of the imaging systems, the conditions for capturing the images, and the like.

The reason is that the output of the feature point arrangement checking device generating mis-corresponding, which is described in the reason for the first issue, is utilized for checking the images.

Further, Patent Document 1 is designed to check a plurality of images inputted in time series with a single image, and it faces such an issue that the image checking processing cannot be done at a high speed.

An object of the present invention is to provide a feature point arrangement checking device, an image checking device, a method as well as a program therefore, which can prevent misjudgment as being in a corresponding relation even when the extent of the changes between the feature point arrangements acquired from the registered image and from the search image is an extent that is not deduced under an actual image capturing condition.

Means for Solving the Problems

In order to achieve the foregoing object, the feature point arrangement checking device according to the present invention is a feature point arrangement checking device which computes arrangements of a plurality of feature points based on feature points acquired from checking target images, generates a feature amount having invariants as elements regarding a geometrical transformation for each of the checking target images based on a computed result thereof, and checks whether or not the feature point arrangements of the checking target images are the same feature point arrangements by using the feature point amounts of the checking target images. The feature point arrangement checking device includes:

a feature point arrangement storage module which stores at least each of the feature point arrangements that are bases for generating the feature amounts;

a parameter estimating module which computes a parameter regarding the geometrical transformation based on the feature point arrangements of the checking target images; and a parameter checking module which checks whether or not the feature point arrangements of the checking target images are the same feature point arrangements by utilizing the computed parameter regarding the geometrical transformation.

The image checking device according to the present invention is an image checking device which computes arrangements of a plurality of feature points based on feature points acquired from checking target images, generates a feature amount having invariants as elements regarding a geometrical transformation for each of the checking target images based on a computed result thereof, and judges whether or not the feature point arrangements of the checking target images are the same feature point arrangements by using the feature point amounts of the checking target images so as to check the images. The image checking device includes:

a feature point arrangement storage module which stores at least each of the feature point arrangements that are bases for generating the feature amounts;

a parameter estimating module which computes a parameter regarding the geometrical transformation based on the feature point arrangements of the checking target images;

a parameter checking module which checks whether or not the feature point arrangements of the checking target images are the same feature point arrangements by utilizing the computed parameter regarding the geometrical transformation; and an image checking result computing module which outputs an image checking result based on number of feature point arrangements judged as the same by the parameter checking module.

In the above described structure, the present invention is built as the feature point arrangement checking device and the image checking device as hardware. However, the present invention may also be built as a method and a program.

Effects of the Invention

With the present invention, it is possible to conduct checking with high precision when the range of the changes considered as the affine transformation between the registered image and the search image can be limited in advance. The reason is that highly accurate checking can be achieved by utilizing the limitation for the checking.

BEST MODES FOR CARRYING OUT THE INVENTION

Next, best modes for carrying out the present invention will be described in detail by referring to the drawings.

First Embodiment

FIG. 1 is a block diagram showing a feature point arrangement checking device according to a first embodiment of the present invention and an image checking device to which the feature point arrangement checking device is applied.
(Hardware Structure of Image Checking Device)

First, a specific structure of the image checking device according to the embodiment will be described first from a hardware structure as a premise, and detailed structures of each module will be described thereafter. FIG. 37 is a block diagram showing an example of the entire structure of hardware of the image checking device according to the first embodiment of the present invention.

Referring to FIG. 37, an image checking device 1 according to the first embodiment is constituted with a CPU 2 that is a part of or an example of a control module as a control device, a storage medium 3, a storage medium 4, an input module 5, and an output module 6.

The CPU 2 administers the entire actions of the image checking device 1 by executing various software programs (computer programs). Other than a single or a plurality of CPUs, for example, a single processor or a plurality of processors selected from MPU, GPU, DSP, and the like can be used to form the control module.

The storage medium 3 (computer readable medium) is a storage medium for storing the various software programs and data required for executing the programs.

The storage medium 4 is a storage medium for supplementing the storage medium 3. A preferable example of the storage medium 3 is a memory such as a RAM which operates at a high speed. The storage medium 4 is a storage medium with somewhat a large capacity, such as a hard disk. It should be noted, however, that the storage medium 3 and the storage medium 4 are not limited only to those. Further, it is also possible to use a new storage medium or a storage module (not shown) as a storage device which has both the function of the storage medium 3 and the function of the storage medium 4. In the embodiment in the followings does not particularly discriminate the storage medium 3 and the storage medium 4.

That is, the embodiment will be described assuming that used is a storage medium which has the functions of the both.

The input module 5 may be provided with an image information input interface function for image information inputted from an image information acquiring module such as a video camera, a digital camera, a scanner, a copying machine, a microscope, a telescope, an X-ray diagnostic device, an ultrasonic diagnostic device, a radar, a sonar, or a CCD, an operation input interface function for operations inputted from an operation input module as an operation input device such as a keyboard, a mouse, various buttons, a touch panel, or the like. Further, the input module 5 may or may not include the image information acquiring module and the operation input module described above (may only include the interface function). Furthermore, the input module 5 may be provided with a first image input module for inputting a search image (first image), a second image input module for inputting a registered image (second image), and the like.

Images inputted to the input module 5 may be two-dimensional still images, three-dimensional space data, moving pictures, or may be images which express a physical quantity that has various expansions in terms of space and time, such as a velocity field or a magnetic field, an image feature amount acquired by various arithmetic operations such as a convolution by a specific function, or chronological changes thereof high dimensionally.

Further, the storage media 3 and 4 may include an image storage region (an image information storage section including a search image information storage section and a registered image information storage section) for storing images (search image, registered image) inputted from the input module 5 and a temporary storage region (VRAM, or the like). Furthermore, the storage media 3 and 4 may include an image checking result storage region for storing the image checking result information. Moreover, the storage media 3 and 4 may include a work region for a control module and a communication module. Further, the storage media 3 and 4 may include various kinds of storage regions for storing the image that is being processed in the image checking device 1 and for storing the image of the processing result. Furthermore, the storage medium 4 may be formed with other various kinds of externally connected computer, optical disk, magneto-optical disk, magnetic tape, and the like.

The output module 6 may include an information output interface function which outputs various kinds of information to an image information output module as an image information output device which outputs image information of a computer display, a television monitor (a display module as a display device), a projector, a printer (an image forming module as an image forming device), and the like. Further, the output module 6 may or may not include the above-described image information output module (may include only the interface function). Furthermore, the image information output module may include a display control module which displays images saved in the image storage region in accordance with an instruction from a user.

In addition, the image checking device 1 may include a communication control module (a modem, a communication processor, or the like) as a communication device (transceiver) for enabling communications with other devices via various kinds of communication networks, a communication interface function, and the like. As the communication interface, it is possible to use a high-speed serial bus data transfer protocol such as IEEE1394 or USB (USB 2.0, or the like).

Further, the image checking device 1 may include an information processing device (computer) that can be used by the user. It is operated by control of programs and may have a network-related communicating function. In this case, the computer is a physical device having a processor (control device; CPU or GPU), a memory (storage medium), an input module, an output module, and the like as basic structural elements. Therefore, the image checking device 1 may be mounted to any kinds of computers regardless of mobile type or fixed type, such as a desktop, a laptop computer, a server computer, other information apparatuses and information house appliances having radio/wired communication functions, or computers similar to those.

Further, in a case where the image checking device 1 has a communication interface function, the device 1 may be formed without the input module 5 and the output module 6.

In this embodiment, the CPU 2 executes software programs according to an image checking start request from the communication interface, the input interface, or the like while referring to the storage media 3 and 4 as appropriate to achieve functions of various kinds of modules shown in FIG. 1 (registering processing, checking processing, and the like). The image checking start request may be inputted operation input data, an operation input signal, or the like, or may be control data or a control signal for controlling various kinds of devices or the like. The programs for the various kinds of modules may be formed as an integrated program or may be formed as separate programs. Thus, the programs may be formed with a registering processing program and a checking processing (searching processing) program or may be formed in an integrated manner as an image checking control program. As described, the programs (programs for causing the computer to execute processing of each module) for enabling the computer function as each device (each module) of the embodiment are stored in the storage medium.

In FIG. 1, a feature point arrangement checking device 10b according to the first embodiment of the present invention is a device which computes the arrangement of feature points based on a plurality of feature points acquired from an image as a checking target, generates a feature amount having invariants regarding a geometrical transformation as elements, and checks whether or not the arrangement of the feature points in the checking-target image is the same arrangement of the feature points by using the feature amounts. The feature point arrangement checking device 10b includes a registered image feature point arrangement computing module 14, a registered image invariant computing module 16, a registered image invariant storage module 18b, a search image feature point arrangement computing module 24, a search image invariant computing module 26, and an invariant coincidence judging module 32.

Further, in addition to the above-described structures, the feature point arrangement checking device 10b according to the first embodiment of the invention includes a registered image feature point arrangement storage module 18a, a parameter estimating module 34, and a parameter checking module 36.

An image checking device 10a according to the first embodiment of the invention shown in FIG. 1 includes a registered image feature point extracting module 12, a search image feature point extracting module 22, a number-of-coincidences storage module 42, and an image checking result computing module 44, in addition to the feature point arrangement checking device 10b.

Referring to FIG. 2, the registered image feature point arrangement storage module 18a includes a registered image feature point coordinates storage module 18a-1 and a registered image feature point combination storage module 18a-2.

The registered image feature point extracting module 12 extracts feature points of an inputted registered image, and stores the coordinates of the extracted feature points to the registered image feature point coordinates storage module 18a-1. An existing method may be used as a method for the registered image feature point extracting module 12 to extract the feature points of the image. As the existing method, there is a method which extracts the centroids of words in English documents described in Non-Patent Document 1, for example. Further, as a method similar to this, there is a method which binarizes an inputted image by an existing method, obtains connection components from the binarized image by using an existing method, and extracts the centroids of the regions of the connection components. In this case, image processing such as filtering processing or image improvement may be executed on the inputted image before executing the binarization. Existing methods for binarization of the inputted image are binarization using fixed threshold values set for pixel values, discriminative binarization using threshold values that are set by utilizing statistical characteristics of the image, etc. However, it is also possible to use other methods. Further, as another method for the registered image feature point extracting module 12 to obtain the feature points of the image, it is also possible to extract feature points in a local region of the image such as at a corner by using an existing method for the inputted image or for the image that is obtained by executing image processing on the inputted image. While the methods for the registered image feature point extracting module 12 to extract the feature points of the image have been presented as examples, the methods are not limited only to those. Any methods can be employed as long as it is the method which can extract or compute, from the registered image and the search image, many corresponding feature points between the both.

The registered image feature point arrangement computing module 14 computes the arrangements of the feature points by using an existing method based on the feature points computed by the registered image feature point extracting module 12, and stores the computed feature point arrangements to the registered image feature point combination storage module 18a-2. As a method for the registered image feature point arrangement computing module 14 to compute the feature point arrangement of the image, it is possible to compute the feature point combination by using a feature point arrangement computing method described in Non-Patent Document 1, for example, or by using a method equivalent to that method.

The registered image invariant computing module 16 computes an invariant list (hereinafter, may be written as feature vector in some cases) by using an invariant computing method described in Non-Patent Document 1 or a method equivalent to that method based on the feature point combinations of the registered image computed by the registered image feature point computing module 14 and the feature point coordinates stored in the registered image feature point coordinates storage module 18a-1. The registered image invariant computing module 16 stores each element of the computed feature vectors to the registered image invariant storage module 18b. The feature point coordinates stored in the registered image feature point coordinates storage module 18a-1 are the same as the feature point coordinates computed by the registered image feature point extracting module 12, so that the coordinates may be inputted to the registered image invariant computing module 16 through the registered image feature point arrangement computing module 14.

The feature vector computed by the registered image invariant computing module 16 is stored in the registered image invariant storage module 18b by being corresponded to the registered image number which can uniquely designate the registered image and the feature point number which can uniquely designate the feature point within the registered image. In this case, the feature vector may be stored by being corresponded to the feature point arrangement number which can designate the feature point arrangement related to the feature point number. The information stored in the registered image invariant storage module 18b is referred by the invariant coincidence judging module 32. Further, the number of feature points extracted from each registered image and the number of feature point arrangements related to each feature point may be stored in the registered image invariant storage module 18b.

The feature point coordinates computed by the registered image feature point extracting module 12 are stored in the registered image feature point coordinate storage module 18a-1. The information stored in the registered image feature point coordinate storage module 18a-1 is referred by the registered image invariant computing module 16 and the parameter estimating module 34.

The feature point combinations computed by the registered image feature point arrangement computing module 14 are stored in the registered image feature point combination storage module 18a-2. The information stored in the registered image feature point combination storage module 18a-2 is referred by the parameter estimating module 34.

The search image feature point extracting module 22 extracts the feature points of the inputted search image, and computes the feature point coordinates. As a method for the search image feature point extracting module 22 to extract the feature points of the search image, the same method used for the registered image feature point extracting module 12 to extract the feature points of the inputted image can be used. However, the extracting method is not limited only to that. Regarding the method used for the search image feature point extracting module 22 to extract the feature points of the search image, it is possible to apply modifications in regards to a preprocessing method or the feature point extracting method depending on the characteristic of the search image acquired by executing image processing and a difference in the image qualities of the registered image and the search image, for example.

However, it is desirable to compute the feature points corresponding to the feature points acquired from the search image also from the registered image, so that it is desirable to use the same method as the case of the registered image feature point extracting module 12 in a case where the conditions for acquiring the registered image and the search image are the same.

The search image feature point arrangement computing module 24 computes the arrangements of the feature points by using an existing method based on the feature points computed by the search image feature point extracting module 22. As a method for the search image feature point arrangement computing module 24 to compute the arrangement of the feature points, it is possible to compute the feature point combination by using a feature point arrangement computing method described in Non-Patent Document 1, for example, or by using a method equivalent to that method.

The search image invariant computing module 30 computes feature vectors by using an invariant computing method described in Non-Patent Document 1 or a method equivalent to that method based on the feature point coordinates computed by the search image feature point extracting module 22 and the feature point combinations of the search image computed by the search image feature point arrangement module 24.

The invariant coincidence judging module 32 judges whether or not the feature vectors stored in the registered image invariant storage module 18b match with the feature vectors Computed by the search image invariant computing module 26. Provided that each element of the feature vectors is discretized as described in Non-Patent Document 1, the invariant coincidence judging module 32 can judge those as being coincident when each element of the feature vectors simply match with each other. Further, the search image feature point arrangement computing module 24 may compute the similarity in a pair of feature vectors by using an already known similarity computing method such as using cityblock distance, Euclidean distance, square sum of error, inner product of vectors, angle formed between two vectors, or the like, and it may be judged as being coincident when the computed similarity is within a specific range that is set in advance.

Based on the feature point coordinates stored in the registered image feature point arrangement storage module 18a-1, the feature point combinations stored in the registered image feature point combination storage module 18a-2, the feature point coordinates computed by the search mage feature point extracting module 22, and the search image feature point combinations computed by the search image feature point arrangement computing module 24, the parameter estimating module 34 estimates the parameter between the feature point arrangements as the base for generating the feature vectors when the invariant coincidence judging module 32 makes judgment as being coincident. The parameter estimating module 34 computes the parameter by using an already known method such as the least square method, assuming that the feature point combination stored in the registered image feature point combination storage module 18a-2 and the search image feature point combination computed by the search image feature point arrangement computing module 24 are corresponded with each other including the orders. In following explanations, an affine transformation is used for a geometrical transformation. Thus, the parameter estimating module 34 is expressed as an affine parameter estimating module 34. As the geometrical transformation, it is not limited only to the affine transformation. Already known transformation methods such as projective transformation and similarity transformation may also be used. The parameter estimating module 34 may compute parameters of the affine transformation, parameters of the projective transformation, parameters of the similarity transformation, and the like by using an already known method such as the least square method, assuming that the feature point combinations stored in the registered image feature point combination storage module 18a-2 and the search image feature point combination computed by the search image feature point arrangement computing module 24 are corresponded with each other including the orders.

The parameter checking module 36 checks whether or not the parameter computed by the parameter estimating module 34 is within a prescribed range that is set in advance based on the specifications of the imaging system for capturing images, conditions for acquiring the images, and the like, and judges that the feature point arrangement of the inputted image and the registered image match with each other when the parameter is within the prescribed range. In following explanations, the affine parameters computed by the affine parameter estimating module 34 are checked, so that the parameter checking module 36 is expressed as an affine parameter checking module 36.

The affine parameter checking module 36 may check the affine parameter based on the fact whether or not the values computed with affine parameters a, b, c, and d to be described later are within a prescribed range. In that case, the affine parameter checking module 36 may set in advance the prescribed range regarding the value of ad−be as an expression (1) which corresponds to the extent of changes in the area between the registered image and the search image, and use that range for checking the affine parameter.

The number-of-coincidences storage module 42 stores the number of feature point arrangements judged as being coincident by the affine parameter checking module 36.

The image checking result computing module 44 computes scores based on the coincident numbers stored in the number-of-coincidences storage module 42, and outputs information which can uniquely designate the registered image as the result, such as the registered image number regarding the registered image corresponding to the highest score, as the image checking result.

Next, the entire operations of the first embodiment will be described in details by referring to flowcharts shown in FIG. 3, FIG. 4, and FIG. 4.

The entire operations of the embodiment can be divided into two types of processing such as registering processing and checking processing. First, the registering processing will be described by referring to FIG. 3 and FIG. 4.

First, values of registered image number z, feature point number rpid, and feature point arrangement number rdid stored in the registered image storage module 18b are initialized (step S101 of FIG. 3). Processing of step S101 may only need to be executed before processing of step S103 described in a later stage is executed for the first time, so that the processing of step S101 may be executed after step S102 to be described in a later stage or during step S102.

Next, processing of step S102 shown in FIG. 4 is executed. Referring to FIG. 3 and FIG. 4, as the processing of step S102, first, the registered image feature point extracting module 12 extracts the feature points from a registered image RIz of the registered image number z, and stores the coordinates of the feature points to the registered image feature point coordinates storage module 18a-1 (step S102a of FIG. 3). The registered image feature point extracting module 12 may also store the number NFP(z) of the feature points of the registered image RIz (step S102b of FIG. 3).

Then, the registered image feature point arrangement computing module 14 acquires information from the registered image feature point extracting module 12 or information stored in the registered image feature point coordinates storage module 18a-1, and computes a feature point arrangement i(rpid, rdid) which is one of the feature point arrangements to be the base for generating the feature vectors from the feature point number rpid of the registered image RIz (step S103 of FIG. 3). As a method for the registered image feature point arrangement computing module 14 to compute the feature point arrangement, it is possible to use the feature point arrangement computing method described in Non-Patent Document 1, for example, or a method equivalent to that method. Needless to say, it is also possible to employ any other methods as long as it is a method that is considered possible to compute corresponding feature point arrangements of a registered image and a search image. The feature point arrangement i(rpid, rdid) computed by the registered image feature point arrangement computing module 14 is stored in the registered image feature point combination storage module 18a-2 (step S104 of FIG. 3).

Then, the registered image invariant computing module 16 computes an invariant list, i.e., a feature vector pi(rpid, rdid), based on the feature point arrangement i(rpid, rdid) of the registered image RIz computed by the registered image feature amount arrangement computing module 14 (step S105 of FIG. 3). The registered image invariant computing module 16 stores the feature vector pi(rpid, rdid) computed in step S105 to the registered image invariant storage module 18a (step S106 of FIG. 3).

The processing from step 101 to step 106 described above is continued until the computing processing for the feature vectors (invariant lists) pi(rpid, rpid) based on the feature point arrangement i(rpid, rdid) for the feature points of all the registered image number z is completed in the process of step S107 of FIG. 3, step S109 of FIG. 3, and step S110 of FIG. 3. After completing step S107, the number of generated feature point arrangements regarding rpid of the registered image RIs may also be stored as NRDID(z, rpid) to the registered image invariant storage module 18b (step S108 of FIG. 3).

Next, the checking processing will be described by referring to FIG. 4. First, initialization processing is executed. Specifically, the coincident number regarding the registered image RIz is set to "0" for all the registered image numbers z (step S201a of FIG. 5). In addition, feature point number qpid of the search image, feature point arrangement number qdid of the search image, and cyclic arrangement number qcid of the search image which uniquely designates the cyclic arrangement are initialized (step S201b of FIG. 5).

Then, the search image feature extracting module 22 extracts feature points from the search image, and computes the number of the feature points and the coordinates of the feature points (step S202 of FIG. 5). At that time, the search image feature extracting module 22 also compute NFQ that is the number of all the feature points (step S202 of FIG. 5).

Then, the search image feature point arrangement computing module 24 computes a feature point arrangement j(qpid, qdid) which is one of the feature point arrangements to be the base for generating the feature vectors from the feature point number qpid of the search image RIz (step S203 of FIG. 5). As a method for the search image feature point arrangement computing module 24 to compute the feature point arrangement, it is possible to use the feature point combinations by using the feature point arrangement computing method described in Non-Patent Document 1, for example, or a method equivalent to that method.

Then, the registered image number z, the feature point number rpid, and the feature point arrangement number rdid are initialized to "1" (step S204 of FIG. 5). This step S204 may be executed right before step S203.

Then, the search image invariant computing module 26 computes an invariant list, i.e., a feature vector q(qpid, qdid, qcid) based on the feature point arrangement j(qpid, qdid, qcid) of the search image computed by the search image feature point arrangement computing module 24.

Then, the invariant coincidence judging module 32 judges whether or not the feature vector regarding the feature point arrangement j(qpid, qdid, qcid) of the search image computed by the search image invariant computing module 26 matches with the feature vector regarding the feature point arrangement i(rpid, rdid) of the registered image RIz computed by the registered image invariant computing module 16 (step S206 of FIG. 5).

The invariant judging module 32 outputs the judgment result to the affine parameter estimating module 34, when judged that the feature vectors match with each other (step S206 of FIG. 5: YES).

When the invariant judging module 32 judges that the feature vectors do not match with each other, the processing is shifted to step S201 of FIG. 5.

The affine parameter estimating module 34 estimates the affine parameter from the feature point arrangement i(rpid, rdid) of the registered image RIz, the feature point coordinates stored in the registered image feature point coordinates storage module 18a-1, the feature point arrangement j(qpid, qdid, qcid) of the search image, and the feature point coordinates computed by the search image feature point extracting module 22 (step 207 of FIG. 5). The affine parameter estimating module 34 outputs the estimated result to the affine parameter checking module 36.

The affine parameter checking module 36 checks whether or not the affine parameter estimated by the affine parameter estimating module 34 or the value computed from the affine parameter is within a prescribed changing range that is set in advance based on the specifications of the imaging systems for capturing the images, the conditions for capturing the images, and the like (step S208 of FIG. 5).

When the affine parameter checking module 36 checks that the parameter or the value computed therefrom is within the prescribed changing range, a control section, not shown, executes processing of step S209 shown in FIG. 5. When the affine parameter checking module 36 checks that the parameter or the value computed therefrom is not within the prescribed changing range, the control section, not shown, executes processing of step S210 shown in FIG. 5.

In step S209 of FIG. 5, the coincident number of the registered image RIz is increased by 1. When step S209 is completed, the processing of step S210 is executed. Judgments conducted in the processing from step S210 to step S215 and processing from step S217 to step S222 are the processing executed for executing repetitive processing in order to collate the feature point arrangements regarding all the registered image numbers, the feature point numbers, and the feature point arrangement numbers with the feature point arrangements regarding all the feature point numbers of the search image, the feature point arrangement numbers, and the cyclic arrangement numbers.

After the repetitive processing is completed, the coincident numbers of each registered image are stored in the number-of-coincidences storage module 42. The image checking result computing module 44 computes the scores by utilizing the coincident numbers stored in a unique number storage module 44, and outputs the registered image of the highest score as an identification/search result (step S216 of FIG. 5). As a method for the image checking result computing module 44 to compute the scores, it is possible to use the method depicted in Non-Patent Document 1 or a method which simply computes the coincident numbers as the scores.

Next, the effects of the first embodiment will be described. The first embodiment is structured to use the coincidence judgment result of the feature point arrangements acquired by the invariant coincidence judging module that is equivalent to the widely-used method together with the checked result of the affine parameter, which is acquired by the affine parameter checking module regarding the affine parameter estimated by the affine parameter estimating module, so that it is possible to execute highly accurate checking of the feature point arrangements and image checking.

Further, the first embodiment is structured to execute the affine parameter checking module only for the feature point arrangements that are judged as being coincident as a result of the coincidence judgment of the feature point arrangements conducted by the invariant coincidence judging module that is equivalent to the widely-used method. Coincidence judgments using the invariants can be done faster than the case of estimating the affine parameter and checking the affine parameter, so that it is possible to execute faster feature point arrangement checking and image checking compared to the case of estimating the affine parameters for all the feature point arrangements and conducting checking regarding the affine parameters.

Second Embodiment

Next, a second embodiment of the best mode for executing the present invention will be described in detail by referring to FIG. 6.

A feature point arrangement checking device 110b according to the second embodiment of the present invention shown in FIG. 6 corresponds to the feature point arrangement checking device 10b shown in FIG. 1, and an image checking device 110a to which the feature point arrangement checking device 110b is applied corresponds to the image checking device 10a shown in FIG. 1.

Comparing the feature point arrangement checking device 110b according to the second embodiment of the present invention shown in FIG. 6 with the feature point arrangement checking device 110 shown in FIG. 1 and comparing the image checking device 110a according to the second embodiment of the present invention shown in FIG. 6 with the image checking device 10a, the second embodiment is different from the first embodiment in respect that the second embodiment uses a feature point arrangement coincidence judging module 136 as the affine parameter checking module 34 shown in FIG. 1. Other structures are the same as those of the first embodiment shown in FIG. 1, and reference numerals showing the structures in FIG. 6 are different from the reference numerals showing the structures of FIG. 1.

The feature point arrangement coincidence judging module 136 conducts coincidence judgment of the feature point arrangements by using both the similarity between the feature vector pair computed by the invariant coincidence judging module 132 and the affine parameter value computed by the affine parameter estimating module 34.

Next, the entire operations of the second embodiment will be described in detail by referring to a flowchart of FIG. 7. In the operations of the second embodiment, the processing of step S208 in the checking processing of the first embodiment shown in FIG. 1 is replaced with step S308.

In step S308 of FIG. 7 for describing the operation of the second embodiment shown in FIG. 6, the feature point arrangement coincidence judging module 136 checks whether or not the similarity of the feature vector pair computed by the invariant coincidence judging module 132, the affine parameter value estimated by the affine parameter estimating module 134 in step S307 of FIG. 7 or the value computed from the affine parameter, or the values computed from those values are within a prescribed changing range that is set in advance based on the specifications of the imaging systems for capturing the images, the conditions for capturing the images, and the like. In this case, for the coincidence judgment regarding the invariant conducted in step S307 of FIG. 7, it is desirable to ease the requisite the invariant is supposed to satisfy in the coincidence judgment conducted in step S308 of FIG. 7 or to conduct the coincidence judgment by different similarity. This is because when the coincidence judgment conducted regarding the invariant in step S307 of FIG. 7 is more restricted than the requisite the invariant in the coincidence judgment conducted in step S308 of FIG. 7 in regards to the same similarity regarding the invariants, the requisite the invariant is to satisfy in the coincidence judgment conducted in step S308 of FIG. 7 cannot be satisfied necessarily. In that case, the processing for that becomes useless judging processing. Further, in a case where all the feature vector pairs are judged as being coincident (e.g., corresponds to a case where a coincidence judgment threshold value regarding the similarity is set as infinity) as a special case of the coincidence judgment regarding the invariant conducted in step S307 of FIG. 7, the affine parameter values are estimated for all the feature point arrangements.

The feature point arrangement coincidence judging module 136 conducts the coincidence judgments for the feature point arrangements based on the estimated affine parameters or the affine parameter values and the similarity of the feature vector pairs.

As described above, in addition to having the same effects of the first embodiment described above, it is also possible with the second embodiment to avoid consuming unnecessary time for executing the processing because of the processing of step S308 which is the distinctive feature of the second embodiment. Therefore, it is possible to achieve still faster feature point arrangement matching and image matching.

Third Embodiment

Next, a third embodiment as the best mode for carrying out the present invention will be described in detail by referring to FIG. 8. The third embodiment of the present invention shown in FIG. 8 illustrates an example of a case where the structure of the first embodiment built with hardware shown in FIG. 1 is built with software.

A program according to the third embodiment of the present invention is loaded into a computer, and the computer executes the loaded program to execute respective functions of a feature point arrangement checking device 202 and an image checking device 201, i.e., the function of a registered image feature point extracting device 212, the function of a registered image feature point arrangement computing device 214, the function of a registered image invariant computing device 216, the function of search image feature point extracting device 222, the function of a search image feature point arrangement computing device 224, the function of a search image invariant computing device 226, the function of an invariant coincidence judging device 232, the function of an affine parameter estimating device 234, the function of an affine parameter checking device 236, and the function of an image checking result computing device 244. For a coincident number storage device 242, a registered image invariant storage device 218b, and a registered image feature point arrangement storage device 218a, a recording medium such as a hard disk attached to the computer is used.

The registered image feature point extracting device 212 executes the same function as that of the registered image feature point extracting module 12 of the first embodiment by control of a registered image feature point extraction program. The registered image feature point arrangement computing device 214 executes the same function as that of the registered image feature point arrangement computing module 14 of the first embodiment by control of a registered image feature point arrangement computing program. The registered image invariant computing device 216 executes the same function as that of the registered image invariant computing module 16 of the first embodiment by control of a registered image invariant computing program. The search image feature point extracting device 222 executes the same function as that of the search image feature point extracting module 22 of the first embodiment by control of a search image feature point extraction program. The search image feature point arrangement computing device 224 executes the same function as that of the search image feature point computing module 22 of the first embodiment by control of a search image feature point arrangement computing program.

The search image invariant computing device 226 executes the same function as that of the search image invariant computing module 26 of the first embodiment by control of a search image invariant computing program. The invariant coincidence judging device 232 executes the same function as that of the invariant coincidence judging module 32 of the first embodiment by control of an invariant coincidence judgment program. The affine parameter estimating device 234 executes the same function as that of the affine parameter estimating module 34 of the first embodiment by control of an affine parameter estimation program. The affine parameter checking device 236 executes the same function as that of the affine parameter checking module 36 of the first embodiment by control of an affine parameter checking program. The image checking result computing device 244 executes the same function as that of the image checking result computing module 44 of the first embodiment by control of an image checking result computing program.

The registered image feature point extracting device 212, the registered image feature point arrangement computing device 214, the registered image invariant computing device 216, the search image feature point extracting device 222, the search image feature point arrangement computing device 224, the search image invariant computing device 226, the invariant coincidence judging device 232, the affine parameter estimating device 234, the affine parameter checking device 236, and the image checking result computing device 244 are not necessarily need to be built with separate computers. Two or more devices may be integrated to be built as a single device. A program loaded therewith is a program which controls to execute the processing of the devices mounted before being integrated.

For example, the image checking device 201 to which the registered image feature point extracting device 212, the registered image feature point arrangement computing device 214, the registered image invariant computing device 216, the search image feature point extracting device 222, the search image feature point arrangement computing device 224, the search image invariant computing device 226, the invariant coincidence judging device 232, the affine parameter estimating device 234, the affine parameter checking device 236, and the image checking result computing device 244 are integrated executes the same functions as those of the image processing device 10a of the first embodiment by control of an image checking program. Further, the image checking device 202 to which the registered image feature point arrangement computing device 214, the registered image invariant computing device 216, the search image feature point arrangement computing device 224, the search image invariant computing device 226, the invariant coincidence judging device 232, the affine parameter estimating device 234, and the affine parameter checking device 236 are integrated executes the same functions as those of the feature point arrangement device 10b of the first embodiment by control of a feature point arrangement checking program.

Fourth Embodiment

Next, a fourth embodiment of the best mode for executing the present invention will be described in detail by referring to FIG. 9. The fourth embodiment of the present invention shown in FIG. 9 is different in respect that a feature point arrangement coincidence judging device 336 is used as the affine parameter checking device 236 of the third embodiment shown in FIG. 8. Other structures are the same as those of the third embodiment show in FIG. 8, and reference numerals are only different from the reference numerals shown in FIG. 8.

The feature point arrangement coincidence judging device 336 is a device structured with a computer, which executes the same functions as those of the feature point arrangement coincidence judging module 136 of the second embodiment shown in FIG. 6 by control of a feature point arrangement coincidence judgment program.

It is the same as the case of the third embodiment of the present invention that the two or more devices can be integrated to be structured as a single device. In this case, a program loaded therewith is a program which controls to execute the processing of the devices mounted before being integrated.

For example, an image checking device 301 to which a registered image feature point extracting device 312, a registered image feature point arrangement computing device 314, a registered image invariant computing device 316, a search image feature point extracting device 322, a search image feature point arrangement computing device 324, a search image invariant computing device 326, an invariant coincidence judging device 332, an affine parameter estimating device 334, a feature point arrangement coincidence judging device 336, and an image checking result computing device 344 are integrated executes the same functions as those of the image processing device 10a of the first embodiment by control of an image checking program.

Further, a feature point arrangement checking device 302 to which the registered image feature point arrangement computing device 314, the registered image invariant computing device 316, the search image extracting device 322, the search image feature point arrangement computing device 324, the search image invariant computing device 326, the invariant coincidence judging device 332, the affine parameter estimating device 334, and the feature point arrangement coincidence judging device 336 are integrated executes the same function as those of the feature point arrangement device 10b of the first embodiment by control of a feature point arrangement checking program.

Fifth Embodiment

Next, the embodiment of the present invention will be described in more detail by using a specific example.

In a fifth embodiment, explanations are provided by using two registered images such as a registered image RI1 shown in FIG. 10 and a registered image RI2 shown in FIG. 11 and by using a search image QI shown in FIG. 12. The registered image shown in FIG. 11 is an image that is obtained by enlarging the registered image RI1 shown in FIG. 10 by almost twice as large and by translating the image. Further, while the registered image RI1 and the search image QI are being translated, the sizes thereof are almost the same. First, registering processing regarding the registered images is executed under that condition.

Initialization is conducted in step S101 of FIG. 3. In this case, initialization is conducted as registered image number z=1, feature point number rpid=1, and feature point arrangement number rdid=0.

Then, processing of steps 102a and 102b shown in FIG. 3 is executed. Since the registered image number z=1, the processing for the registered image RI1 shown in FIG. 10 is executed.

The registered image feature point extracting module 12 extracts feature points from the registered image RI1, and extracts the coordinates of the feature points. As a method for the registered image feature point extracting module 12 to extract the feature points of the registered image, binarization is conducted by fixed binarization, the connection components thereof are obtained, and the centroids thereof are extracted as the feature points, for example. The registered image feature point extracting module 12 extracts eight feature points from the registered image as shown in FIG. 13, for example. The numbers from 1 to 8 in FIG. 9 correspond to the feature point numbers rpid, respectively. The feature point numbers rpid and the coordinates (X-coordinate and Y-coordinate on plane coordinates) of the feature points are stored in the feature point coordinates storage module 18a-1 in a corresponding manner as shown in FIG. 10.

Then, the processing from step S103 of FIG. 3 to step S109 of FIG. 3 is executed. The processing executed therein is the processing for computing all the feature point arrangements and all the feature vectors which can be computed from the registered image RI1. Specific explanations will be provided.

That is, in step S103 of FIG. 3, the registered image feature point arrangement computing module 14 executes (A) processing for extracting one registered image.

Then, the registered image feature point arrangements computing module 14 executes processing (B) which extracts one point from a set of the feature points as a feature point p, and extracts n-number of neighborhood points of the feature point p as the feature points Pn.

The registered image feature point arrangement computing module 14 executes processing (C) which extracts m-points from the n-number of neighborhood feature points Pn of the feature point as a feature points Pm.

Then, the registered image feature point arrangement computing module 14 executes processing (D) which selects an appropriate point for the elements of the feature points Pm of the extracted m-points as a feature point p0, and generates a line Lm of the feature points by arranging the points clockwise by having the feature point p in the center and having the feature point p0 as the head.

Thereafter, the registered image feature point arrangement computing module 14 executes processing (E) which finds all lines. Lf of the feature points which select f-point from the line Lm of the feature points by saving the order, and arranges those in order as in dictionaries.

In a case where m=7 and f=5, for example, the registered image feature point arrangement computing module 14 acquires [(p0, p1, p2, p3, p4), (p0, p1, p2, p3, p5), - - -, (p2, p3, p4, p5, p6) as [Lf(0), - - -, Lf(γC5−1)).

In the processing of (A)-(E) described above, the registered image feature point arrangement computing module 14 controls to continue the processing of (A) until the processing is executed for all the registered images. Further, in the processing of (A)-(E) described above, the registered image feature point arrangement computing module 14 controls to continue the processing of (B) until selecting all the feature points p. Furthermore, in the processing of (A)-(E) described above, the registered image feature point arrangement computing module 14 controls to continue the processing of (C) until the processing is executed for the combinations of all the m-points acquired from the n-number of points.

Note here that the registered image feature point arrangement computing module 14 generates combinations of a plurality of points from the neighborhood points in a wide range, and computes a plurality of feature amounts therefrom. This is based on an assumption that same points are contained up to the m-points among the neighborhood n-points in a range that is considered wide to some extent, even if there is an influence of projection distortion. Assuming that the m-points among the neighborhood n-points are the same, at least one same feature amount can be acquired by creating the combinations of all the m-points from the n-points, i.e., $P_{m(0)}$, $P_{m(1)}$, - - -, $P_{m(nC_{m-1})}$, and computing the respective feature amounts. As a method for expressing the arrangement of m-points, used is an invariant line r(0), r(1), - - -, r(mC$_{f-1}$), which is computed from all the combinations of f-points acquired from m-points.

Since it is set as n=7 and m=6, the registered image feature point arrangement computing module 14 acquires (2, 5, 6, 8, 4, 1) as a combination of the feature points regarding the feature point number rpid=3 and the feature point arrangement number rdid=1, for example. Then, as shown in FIG. 15, the registered image feature point arrangement computing module 14 stores the combination of the feature points along with the feature point number and the feature point arrangement number in the registered image feature point arrangement storage module 18a in a corresponding manner.

The registered image invariant computing module 16 computes the invariable list (may be depicted as feature vector hereinafter) from the combination of the registered image feature points computed by the registered image feature point arrangement computing module 14 and the feature point coordinates stored in the registered image feature point coordinates storage module 18a-1 by an invariant computing method using affine invariants or the like computed by P(A, C, D)/P(A, B, C) from the coordinates of four points ABCD (f=4) on a same plane (note that P(A, B, C) is an area of a triangle formed with apexes of A, B, C) or a method equivalent to that method. Each element of the computed feature vector is stored in the registered image invariant storage module 18b.

In step S105 of FIG. 3, the registered image invariant computing module 16 computes the feature vector. Here, the registered image invariant computing module 16 computes the feature vector with a certain rule from the combination of the feature points as a method equivalent to the processing (E) regarding the registering processing depicted in Non-Patent Document 1. Since it is set as m=6 and f=4, the registered image invariant computing module 16 generates a feature vector that includes fifteen elements. Specifically, the registered image invariant computing module 16 acquires feature point numbers fv1, fv2, fv3, fv4 for computing the invariants from the combination shown in FIG. 16 for each element, acquires the coordinates (fv1$x$, fv1$y$) of the feature point fv1, the coordinates (fv2$x$, fv2$y$) of the feature point fv2, the coordinates (fv3$x$, fv3$y$) of the feature point fv3, and the coordinates (fv4$x$, fv4$y$) of the feature point fv4 by referring to FIG. 14, and acquires the affine invariants (feature vectors) from the acquired coordinates by computing affine invariants (feature vectors) by using the following value.

$$\frac{(fv_{3x} - fv_{1x})(fv_{4y} - fv_{1y}) - (fv_{3x} - fv_{1x})(fv_{4x} - fv_{1x})}{(fv_{2x} - fv_{1x})(fv_{3y} - fv_{1y}) - (fv_{2y} - fv_{1y})(fv_{3x} - fv_{1x})}$$

It is easily worked out from the affine invariants depicted in (Non-Patent Document 2) that the value computed by this formula is an invariant regarding the affine transformation. As a result, as shown in FIG. 15, the feature vectors are stored. For example, the feature vectors for the feature point number rpid=3 and the feature point arrangement number rdid=1 are (0.398 - - -, 0.294 - - -, 0.408 - - -, 1.024 - - -, 1.317 - - -, 12.927 - - -, 0.760 - - -, 0.977 - - -, 13.456 - - -, 13.088 - - -, 0.036 - - -, 0.034 - - -, 0.916 - - -, 2.770 - - -, 2.016 - - -).

(Non-Patent Document 2) Jun SATO, Computervision, CORONA Publishing Co., Ltd, 1999, pp 56-59

When the processing from step S102 to step S109 shown in FIG. 3 for the registered image RI1 is completed, the invariants and the feature point combinations are computed as shown in FIG. 11. Thereafter, the processing is advanced to step S110 of FIG. 3.

In step S110 of FIG. 3, the invariant coincidence judging module 32 outputs a judgment result "NO" since the number of registered image is "2". Thus, processing of step S102 of FIG. 3 and thereafter is executed for the registered image RI2 shown in FIG. 17 with the registered image number z=2, the feature point number mid=1, and the feature point arrangement number rdid=1. The processing from step S102 to step S109 of FIG. 3 executed regarding the registered image RI2 is the same processing for the registered image RI1, so that the explanations are omitted.

Regarding the registered image RI2, the registered image feature point extracting module 12 extracts eight feature points as shown in FIG. 18, and computes the feature vectors as well as the feature point combinations shown in FIG. 19, and the feature point coordinates shown in FIG. 20. For example, the feature vectors for the case where the feature point number mid=3 and the feature point arrangement number rdid=1 are (0.398 - - -, 0.294 - - -, 0.408 - - -, 1.024 - - -, 1.317 - - -, 12.927 - - -, 0.760 - - -, 0.977 - - -, 13.456 - - -, 13.088 - - -, 0.036 - - -, 0.034 - - -, 0.916 - - -, 2.770 - - -, 2.016 - - -). In FIG. 18, the feature point numbers are also written.

Next, the checking processing regarding the search image QI will be described. First, processing of step S201a and step S201b shown in FIG. 5 is executed. The coincident number of the registered images RIz with regard to all the search image numbers z is set as "0". Further, the values of the feature point number qpid, the feature point arrangement number qdid, and the cyclic arrangement number qcid are initialized. In this case, the values are initialized as the feature point number qpid=1, the feature point arrangement number qdid=0, and the cyclic arrangement number qcid=0.

Then, in step S202 of FIG. 5, the processing by the search image feature point extracting module 22 is executed. This processing is the same as the processing executed by the registered image feature point extracting module 12 in step S102 shown in FIG. 3, so that detailed explanations of the processing contents are omitted. The search image feature point extracting module 22 extracts eight feature points from the search image as shown in FIG. 16, and computes the feature vectors, the feature point combinations, and the feature point coordinates shown in FIG. 20. In FIG. 21, the feature point numbers are also written.

Then, the processing from step S203 to step S215 and from step S217 to step S222 shown in FIG. 5 is executed. The processing thereof is for computing all the feature point arrangements and feature vectors which can be computed from the search image QI and for conducting checking based on the feature vectors and checking based on the affine parameters.

In step S203 of FIG. 5, the search image feature point arrangement computing module 24 executes the same processing (A), (B), (C), and (D) executed by the registered image feature point extracting module 14. In step S205 of FIG. 5, the search image invariant computing module 26 computes the invariant, i.e., the feature vector. For computation of the feature vector executed by the search image invariant computing module 26, the same method as the feature point vector computing method employed in step S105 of FIG. 3 by the registered image invariant computing module 16 is used. Thus, explanations thereof are omitted. For example, the feature vectors for the case where the feature point number qpid=3, the feature point arrangement number qdid=1, and the cyclic arrangement number qcid=0 computed by the search image invariant computing module 26 are (0.398 - - -, 0.294 - - -, 0.408 - - -, 1.024 - - -, 1.317 - - -, 12.927 - - -, 0.760 - - -, 0.977 - - -, 13.456 - - -, 13.088 - - -, 0.036 - - -, 0.034 - - -, 0.916 - - -, 2.770 - - -, 2.01671).

Then, in step S206 of FIG. 5, the invariant coincidence judging module 32 conducts matching of the feature vectors of the search image and the feature vectors regarding the feature point arrangement i(rpid, rdid) of the registered image RIz stored in the registered image invariant storage module 18*a*. In this example, the invariant coincidence judging module 32 judges that the feature vectors match with each other, when the square sum of error of the feature vectors does not exceed a threshold value 0.001 as the standards for making judgment about the matching. For example, when the registered image number z of the registered image is 1, the feature point number mid of the registered image is 3, and the feature point number rqid of the registered image is 1, the feature vectors for the case where the registered image number z of the registered image is 1 (i.e., the registered image RI1), the feature point number mid of the registered image is 3, and the feature point arrangement number rqid of the registered image number is 1 are (0.398 - - -, 0.294 - - -, 0.408 - - -, 1.024 - - -, 1.317 - - -, 12.927 - - -, 0.760 - - -, 0.977 - - -, 13.456 - - -, 13.088 - - -, 0.036 - - -, 0.034 - - -, 0.916 - - -, 2.770 - - -, 2.016 - - -). Thus, the value of the square sum of error becomes 0.0000 - - -. Therefore, the invariant coincidence judging module 32 judges that the feature vectors match with each other. Further, the sum square of error in regards to the feature vectors for the case where the registered image number z of the registered image is 2 (i.e., the registered image RI2), the feature point number mid of the registered image is 3, and the feature point arrangement number rqid of the registered image is 1 is also 0.0000 - - -. Therefore, the invariant coincidence judging module 32 judges that the feature vectors match with each other.

Then, in step S207 of FIG. 5, the affine parameter estimating module 34 estimates the affine parameter from the feature point arrangements that are the base for generating the feature vectors judged as being coincident by the invariant coincidence judging module 32. The affine parameter estimating method executed by the affine parameter estimating module 34 is a method described below, for example. That is, the affine parameter estimating module 34 assumes that the feature point combinations that are the base for generating the feature vectors judged as being coincident in step S206 of FIG. 5 by the invariant coincidence judging module 32 match with each other including the orders. That is, provided that the coordinates of each feature point idk ($1 \leq k \leq 6$) in the feature point combinations regarding the registered image are (xk, yk) and the coordinates of each feature point in the feature point combinations regarding the search image are (xk', yk'), there exits a following relation between (xk, yk) and (xk', yk'). Note here that a, b, c, d, e and f are the affine parameters.

$$\begin{pmatrix} x'_k \\ y'_k \end{pmatrix} = \begin{pmatrix} a & b \\ c & d \end{pmatrix} \begin{pmatrix} x_k \\ y_k \end{pmatrix} + \begin{pmatrix} e \\ f \end{pmatrix}$$

This can be transformed as follows.

$$\alpha = \begin{pmatrix} x'_1 \\ y'_1 \\ x'_2 \\ y'_2 \\ \dots \\ x'_6 \\ y'_6 \end{pmatrix}$$

$$X = \begin{pmatrix} x_1 & y_1 & 0 & 0 & 1 & 0 \\ 0 & 0 & x_1 & y_1 & 0 & 1 \\ x_2 & y_2 & 0 & 0 & 1 & 0 \\ 0 & 0 & x_2 & y_2 & 0 & 1 \\ & & \dots & & & \\ x_6 & y_6 & 0 & 0 & 1 & 0 \\ 0 & 0 & x_6 & y_6 & 0 & 1 \end{pmatrix}$$

$$\beta = \begin{pmatrix} a \\ b \\ c \\ d \\ e \\ f \end{pmatrix}$$

By using the above, $\alpha = X\beta$ can be obtained. When $\beta$ is estimated by the least square method, the estimated value can be obtained as follows.

$$\hat{\beta} = (X^T X)^{-1} X^T \alpha$$

Based on this, the affine parameter estimating module 34 executes computation, and acquires a=1.00 - - -, b=-0.00 - - -, c=-0.00 - - -, d=1.00 - - -, e=-51.00 - - -, and f=40.00 - - - in the case of the feature point arrangement of the registered image RI1 with rpid=3, rqid=1, and the feature point arrangement of the search image with qpid=3, qdid=1, qcid=0.

Then, in step S208 of FIG. 5, the affine parameter checking module 36 checks whether or not the affine parameter values estimated by the affine parameter estimating module 34 in step S207 of FIG. 5 are within a prescribed range. The prescribed range can be determined based on the conditions for acquiring the image. For example, it is assumed as follows.

$$\begin{pmatrix} x'_k \\ y'_k \end{pmatrix} = \begin{pmatrix} a & b \\ c & d \end{pmatrix} \begin{pmatrix} x_k \\ y_k \end{pmatrix} + \begin{pmatrix} e \\ f \end{pmatrix} = \begin{pmatrix} A & O \\ O & B \end{pmatrix} \begin{pmatrix} \cos\theta & -\sin\theta \\ \sin\theta & \cos\theta \end{pmatrix} \begin{pmatrix} x_k \\ y_k \end{pmatrix} + \begin{pmatrix} e \\ f \end{pmatrix}$$

This expresses transformation in which (xk, yk) is rotated by $\theta$, which is enlarged by A in x direction and by B in y direction, and translated by (e, f). In this embodiment, "$1/1.3 \leq A \leq 1.3$, $1/1.3 \leq B \leq 1.3$, $-30° \leq \theta \leq 30°$" are considered as the prescribed ranges. In this case, possible ranges of a, b, c, d are as follows.

$$\frac{\sqrt{3}}{2.6} \leq a \leq 0.37$$

$$-0.65 \leq b \leq 0.65$$

-continued $$-0.65 \leq c \leq 0.65$$

$$\frac{\sqrt{3}}{2.6} \leq d \leq 1.3$$

The affine parameter checking module 36 judges that the affine parameters are within the prescribed ranges, when all the values of a, b, c, and d computed by the affine parameter estimating module 34 are within those ranges. In a case where a=1.00 - - -, b=−0.00 - - -, c=−0.00 - - -, d=1.00 - - -, e=−51.00 - - -, and f=40.00 - - -, that condition is satisfied. Thus, the affine parameter checking module 36 judges the prescribed ranges are satisfied. Thus, in step S209 of FIG. 5, processing for increasing the coincident number regarding the registered image RI1 by 1 is executed.

In a case of the feature point arrangement regarding the registered image RI2 with rpid=3, rqid=1 and the feature point arrangement regarding the search image with qpid=3, qdid=1, qcid=0, the values are computed by the affine parameter estimating module 32 as a=0.50 - - -, b=−0.00 - - -, c=−0.00 - - -, d=0.50 - - -, e=−3.75 - - -, and f=49.25 - - -. In this case, the values of a and b are not within the prescribed ranges to be satisfied, so that the affine parameter checking module 36 judges as being unmatched. Thus, in step S209 of FIG. 5, the processing for increasing the coincident number regarding the registered image RI2 by 1 is not executed.

When the processing from step S203 to step S215 and from step S217 to step S222 shown in FIG. 5 is completed, the processing by the image checking result computing module 44 in step S216 is executed. Here, the image checking result computing module 44 simply utilizes the coincident numbers for each registered image as the scores, and outputs the registered image number of the highest score. In this example, the score regarding the registered image RI1 is 74 and the score regarding the registered image RI2 is 0, so that the image checking result computing module 44 outputs the registered image number 1.

As described above, when the rational conditions for acquiring images can be assumed in advance, it is possible with the embodiment of the present invention to conduct checking with still finer precision by setting and utilizing the prescribed ranges that are set in advance based on the image acquiring conditions and the like compared to the case of conducting checking of a widely-used technique which is done only with checking of the feature vectors having the invariants as the elements.

Further, the embodiment of the present invention can provide the feature point arrangement checking device capable of conducting the checking with high precision, in a case where the range of changes considered as the affine transformation between the registered image and the search image can be limited in advance. This is because the use of limitation for the checking makes it possible to conduct the checking with higher precision.

Furthermore, the embodiment of the present invention can provide the feature point arrangement checking device capable of conducting the checking with high precision and at a high speed, in a case where the range of changes considered as the affine transformation between the registered image and the search image can be limited in advance. This is because the use of limitation for the checking makes it possible to conduct the checking with higher precision. It is also because the embodiment is structured to execute the affine parameter checking module only for the feature point arrangements judged as being coincident as a result of coincidence judgment conducted on the feature point arrangements by the invariant coincidence judging module that is equivalent to the widely-used method.

Moreover, the embodiment of the present invention can provide the image checking device capable of conducting the checking with high precision, in a case where the range of changes considered as the affine transformation between the registered image and the search image can be limited in advance. This is because of the use of the feature point arrangement checking device according to the embodiment of the present invention.

Further, the embodiment of the present invention can provide the image checking device capable of conducting the checking with high precision and at a high speed, in a case where the range of changes considered as the affine transformation between the registered image and the search image can be limited in advance. This is because of the use of the feature point arrangement checking device according to the embodiment of the present invention.

Sixth Embodiment

Next, a sixth embodiment of the present invention will be described by referring to FIG. 22. The structure of the sixth embodiment shown in FIG. 22 is obtained by adding a parameter space vote number storage module 446 and a number-of-coincidences computing module 448 to the structure of the first embodiment shown in FIG. 1. Each structural element other than the parameter space vote number storage module 446 and the number-of-coincidence computing module 448 is the same as the elements described in the structure of the first embodiment, and only reference numerals are different.

The parameter space vote number storage module 446 has a plurality of vote number storing regions for storing the numbers of feature point arrangements judged as being coincident by the affine parameter checking module 436, and stores those by classifying them into the sets of affine parameters that are in almost same values. It is prepared for setting the regions in accordance with the values of the affine parameters estimated from a first feature point group and a second feature point group. The specific way of storing the vote numbers will be described in detail when describing the operation of the parameter space vote number storage module 446 and the number-of-coincidences computing module 448 later.

The number-of-coincidences computing module 448 computes the coincident numbers to be stored in the number-of-coincidences storage module 442 from the vote numbers stored in one vote number storing region or more in the parameter space vote number storage module 446. The specific way of storing a plurality of coincident numbers will be described in detail when describing the operation of the parameter space vote number storage module 446 and the number-of-coincidences computing module 448 later.

Next, the flow of the processing of the sixth embodiment will be described. The flow of the processing of the sixth embodiment is the same as the flow of FIG. 5 showing the processing of the first embodiment, except that a part of the checking processing is changed. The modifications are as follows. There are three points of modifications, i.e., step S4051 (see FIG. 23) is added between step S205 and step S206, the processing of step S209 is replaced with step S409 (see FIG. 24), and step S4111 (see FIG. 25) is added between step S211 and step S212.

Hereinafter, operations of step S4051, step S409, and step S4111 will be described.

[Preprocessing Executed Once for Every Registered Image: Step S4051]

The operation executed in step S4051 will be described by referring to FIG. 26. Ranges of possible values of parameters a, b, c, d and ranges of possible values of point (x, y) on a registered image and point (xq, yq) on a search image are determined (step S40511). For example, the prescribed ranges of the values of a, b, c, d utilized when the affine parameter checking module 436 conducts checking can be defined as the possible values of a, b, c, d. For example, it is assumed that the possible values of a are "amin≦a≦amax", the possible values of b are "bmin≦b≦bmax", the possible values of c are "cmin≦c≦cmax", and the possible values of d are "dmin≦d≦dmax".

Further, xmax, ymax to be an image having the region defined with 1≦x≦xmax, 1≦y≦ymax are obtained. The size (width or height) of the registered image may be used for this. Similarly, for (xq, yq), xqmax, yqmax to be an image having the region defined with 1≦xq≦xqmax, 1≦yq≦yqmax are obtained from the size (width or height) of the search image.

Then, ranges of possible values of e and f are determined (step S40512).

For example, there is a following method. There are following relationships between a point (x, y) on a registered image and a point (xq, yq) on a search image (an image having a region defied with 1≦xq≦xqmax, 1≦yq≦yqmax).

$xq = ax + by + e$ $yq = cx + dy + f$

Those can be rewritten to the followings.

$e = xq - (ax + by)$ $f = yq - (cx + dy)$

Thus, provided that ranges of possible values for e are emin≦e≦emax and fmin≦f≦fmax, the followings can be obtained $emin = min(xq - (ax + by))$ $emax = max(xq - (ax + by))$ $fmin = min(yq - (cx + dy))$ $fmax = max(yq - (cx + dy))$ Note here that min(·) shows the value which makes the numerical expression within a parenthesis minimum for the combinations of all the possible values of a, b, c, d, x, y, xq, and yq. Similarly, max(·) shows the value which makes the numerical expression within a parenthesis maximum for the combinations of all the possible values of a, b, c, d, x, y, xq, and yq. In a case where a≈1, b≈0, c≈0, and d≈1, it is natural to think that a, b take only positive values and b, c can take both positive and negative values. In other words, it is natural that amin, amax, bmax, cmax, dmin, dmax take positive values, and bmin, cmin take negative values.

It is possible to define as follows.

$emin = xqmax - (amax \cdot xmax + bmax \cdot ymax)$ $emax = xqmin - (bmin \cdot ymax)$ $fmin = yqmin - (cmax \cdot xmax + dmax \cdot ymax)$ $fmax = yqmax - (cmin \cdot xmax)$ It is also possible to separately determine the ranges of possible values of e and f by considering other conditions that are obtained in advance, or to determine the possible values of e and f determined in advance. Alternatively, it is possible to determine the final ranges of the possible values by combining the two ranges mentioned above.

Then, the range of possible values determined for each parameter is divided (step S40513). For example, sections obtained by dividing the section of [amin, amax] into Na-pieces are defined as sections a1, a2, - - - , aNa. In the same manner, sections b1, - - - , bNb, sections c1, - - - , cNc, sections d1, - - - , dNd, sections e1, - - - , eNe, and sections f1, - - - , fNf are obtained. For Na, Nb, Nc, Nd, Ne, and Nf, values set in advance may be used or values may be defined based on characteristics and the like required for the sections (restrictions regarding the size of the sections, and the like). In the followings, it is assumed that the numbers of Na, Nb, Nc, Nd, Ne, and Nf are defined in advance.

Then, the vote numbers for the storing regions corresponding to the combinations of each section are initialized to "0" (step S40514).

[Processing Executed Every Time when Judged as being Coincident by Affine Parameter Checking Module 36: Step S409]

In step S409, executed is a procedure for updating the vote numbers regarding the storing regions corresponding to combinations in each section. By referring to FIG. 27, operations of step S409 will be described. First, it is judged that the combination of the affine parameter values between the first feature point group and the second feature point group which are estimated when judged by the affine parameter checking module 436 as being coincident corresponds to which of the divided sections computed in step S40513 (step S4091). The vote number of the storing region corresponding to divided section is increased by 1 (step S4092).

As described, the individual storing region for the combination of each section is prepared. This makes it possible to compute the vote number by each storing region of the combination of the section to which the estimated affine parameter corresponds. For example, it can be achieved by executing the processing to increase by 1 the storing region corresponding to the combination of the corresponding section for each affine parameter judged as being coincident by the checking conducted by the affine parameter checking module 436 for all the storing regions initialized to "0" in advance.

The processing other than step S40514 of [processing executed once for every registered image: preprocessing] can be executed also every time before the procedure for updating the vote number. In that case, the processing that may be executed once is executed for a plurality of times. Therefore, it is desirable to employ a structure with which the processing is executed once for every registered image as in the case of a twelfth embodiment.

(Processing Executed Once for Every Registered Image: Postprocessing: Step S4111)

Referring to FIG. 28, step S4111 is a step for executing the following processing. That is, the number-of-coincidences computing module 448 computes the number of coincidences to be stored in the number-of-coincidences storage module 442 by using the vote number for each combination of the sections stored in the parameter space vote number storage module 442 (step S41111), and then stores the computed number of coincidences to the number-of-coincidences storage module 442 (step S41112).

For example, the maximum coincidence number among the coincidence numbers for each of the combinations of the respective section stored in the parameter space vote number storage module 446 can be taken as the number of coincidences to be stored in the number-of-coincidences storage module 442.

As another method for computing the number of coincidences to be stored in the number-of-coincidences storage module 442, there is a method which computes the total sum of the number of coincidences of the combination of the target section and the number of coincidences of the combinations of the sections neighboring to the combination of the target section.

For example, provided that the combination of the target section is ai($1 \leq ai \leq Na$), bi($1 \leq bi \leq Nb$), ci($1 \leq ci \leq Nc$), di($1 \leq di \leq Nd$), ei($1 \leq ei \leq Ne$), and fi($1 \leq fi \leq Nf$), the total sum of the coincident numbers of the combinations of all the sections generated from {max(1, ai−1), ai, min(ai+1, Na)} as aj and {max(1, bi−1), bi, min(bi+1, Nb)} as bj, - - - , and {max(1, fi−1), fi, min(fi+1, Nf)} as fj may be computed.

It is of course possible to use the combinations of other sections such as the neighboring sections of only a part of the parameters. Alternatively, up to two neighboring sections may be allowed for a certain parameter to take the total sum thereof as the combination of the target section to be computed. Further, it is also possible to compute the number of coincidences not simply with the total sum but also by giving weight on the number of coincidences of the combinations of the sections and by adding them.

By having a plurality of kinds of coincident numbers described above as the intermediate coincident numbers, it is possible to conduct judgment through computing the coincident number from the intermediate coincident numbers. This means that the image checking result can be computed from the plurality of intermediate coincident numbers. Thus, it is not necessarily the essence to compute a single coincident number. The same function can be formed also with a device for storing a plurality of kinds of coincident numbers and a device which computes the image checking result from the plurality of coincident numbers. However, it is theoretically the same, so that explanations thereof are omitted.

Further, it is also possible to compute the image checking result by using a value that is a corrected value of the coincident number or the intermediate coincident number based on the conditions determined in regards to the target.

The sixth embodiment is so structured that the regions for storing the number of coincidences of the combinations of the sections for all the registered images become unnecessary by executing initialization for each registered image z. It is of course possible to employ a structure which prepares the regions for storing the number of coincidences of the combinations of the sections for all the registered images. However, compared to that case, there is an advantage with the twelfth embodiment that the required regions can be reduced.

With the sixth embodiment, peculiar effects as follows can be achieved. Widely-used methods may misjudge that a registered image and a search image correspond to each other (the image search result is matched) in a case where feature point arrangements that can be transformed with affine transformation are acquired accidentally even though the images do not correspond to each other, so that it is not possible to conduct accurate image searching and image checking. In the meantime, as has already been described, it is possible to improve the issues of the widely-used methods with the effect of the basic structure of the feature point matching device according to the embodiment of the present invention. However, there are still same issues remained if the method for checking the estimated affine parameters cannot judge only the feature point group with an appropriate parameter as being coincident. For example, a case where a specific range set in advance is relatively wide corresponds to such case.

The sixth embodiment is the method for overcoming such issues on a prerequisite that the registered image and the search image can be written with the affine transformation almost uniformly. In a case where the registered image and the search image are in a relationship that those images can be written with almost uniform affine transformation, it can be imagined that the parameters estimated from the first feature point group and the second feature point group have almost the same values. If so, it is considered that estimated parameter group is distributed in the periphery of the combination of the parameters having certain values. Inversely, the parameters in the region where not many parameters are distributed may be considered a case where the feature point arrangements that can be transformed with the affine transformation are acquired accidentally even though those do not correspond to each other. Thus, compared to the case of the basic structure of the feature point arrangement, it is possible to reduce the cases of accidentally acquiring the feature point arrangements that can be transformed with the affine transformation even though those do not correspond to each other correspond, through taking the number of coincidences stored in a given storing region considered as a region where relatively greater number of parameters are distributed or the total sum of the coincident numbers stored in a given storing region and in the neighboring storing regions as the feature point arrangement coincident numbers to be outputted.

Through the above, it is possible with the sixth embodiment to expect further improvements on a precondition that the registered image and the search image can be written with the affine transformation almost uniformly.

Other structures, other steps, and the operational effects thereof are the same as the case of the first embodiment described above. The operation contents of each of the steps and the structural elements of each component described in the above explanations may be put into programs to be executed by a computer. Alternatively, all of the operation contents of each of the above-described steps and the structural elements of each component described in the above may be structured with hardware to be executed with the hardware. Further, a part of the operation contents of each of the steps and the structural elements of each component described in the above may be structured with hardware, and the remaining structural elements may be put into programs to be executed with the hardware and a computer in cooperation.

Seventh Embodiment

Next, a seventh embodiment of the present invention will be described. The seventh embodiment pays attentions to the fact that the affine parameters (geometric transformation parameters) are obtained as the means for conducting checking in the embodiments of the present invention described heretofore. If the affine parameter between a registered image and a search image can be obtained, a same image is ought to be obtained idealistically by transforming one of the images with the affine parameter. By utilizing that image, it is considered possible to check the images by utilizing the result obtained by projecting one of the images to the other image, for example.

Actually, an image checking device designed with such approach has already been proposed. For example, Japanese Unexamined Patent Publication 2001-092963 discloses an image checking method and device for a face region in an image. In the patent document, disclosed is a method which estimates geometrical transformation parameters for a local region (window) image in an image based on a corresponding relationship between window data and input window data within a feature space, executes correction processing of an inputted image by using the geometrical transformation parameter, and computes the similarity in the image checking.

By using the checking principle based on the coincident number of the feature vectors described heretofore (use of local arrangement of feature points) in combination with the checking principle of the image checking device using projection of images as a means therefore (use of image information not limited to the feature points), still higher accuracy can be expected. This combination has such an advantage that the structure for obtaining the affine parameters required for projection can be formed efficiently by utilizing the structure contained in the image checking device that uses the feature vector coincident number. A thirteenth embodiment is a mode proposed based on such idea.

FIG. 29 is a block diagram showing a simple example of the seventh embodiment. Referring to FIG. 29, a projection affine parameter computing module 560, an image projecting module 562, and a projected image checking module 564 are added to the widely-used structure. Further, the functions of the image checking result computing module 544 include an additional function. The structural elements other than those are the same as the case of the sixth embodiment.

The projection affine parameter computing module 560 obtains one projection affine parameter or more for the image projecting module 562 to project a search image on a registered image or to project a registered image on a search image based on the vote numbers stored in one vote number storing region or more of the parameter space vote number storage module 546. Hereinafter, explanations are continued by referring to the case where the search image is projected on the registered image. However, it is to be noted that the case of projecting the registered image on the search image is theoretically the same, and it can be done through almost the same procedure.

The projection affine parameters are expressed with ap, bp, cp, dp, ep, and fp. For the projection parameters, values in common to the whole regions where an image is defined may be used, or different values may be used depending on the regions of the image. Different values can be computed depending on the regions of the image by finding the relationship between the affine parameters computed by the affine parameter estimating module 543 and the position of the feature point arrangement generating the computed feature vector pair on the registered image or the position on the search image, etc. Hereinafter, explanations will be provided assuming that the values in common to the whole regions where the image is defined are used. Further, it is to be noted that a structure 550 obtained by adding the parameter space vote number storage module 546 and the projection affine parameter computing module 560 to the feature point checking device 502 functions as an element group which provides the affine parameter estimating functions.

The image projecting module 562 projects a search image on a registered image by using the projection affine parameters computed by the projection affine parameter computing module 560. The projection herein means to transform the registered image with a following correspondence. That is, the coordinates (xp, yp) of the image after projection (projected registered image) and the coordinates (xq, yq) on the search image are assumed to be corresponded with a following expression.

$$\begin{pmatrix} xp \\ yp \end{pmatrix} = \begin{pmatrix} ap & bp \\ cp & dp \end{pmatrix} \begin{pmatrix} xq \\ yq \end{pmatrix} + \begin{pmatrix} ep \\ fp \end{pmatrix}$$

The projected image checking module 564 checks the projected registered image with the registered image to compute one indicator or more regarding the similarity in the checking. The similarity for the image checking can be obtained with an existing method. The image checking result computing module 544 computes the image checking result by utilizing the similarity computed by the projected image checking module 564 in addition to the feature vector coincident number.

Next, operations of the simple example of the seventh embodiment will be described by referring to differences with respect to the operations of the sixth embodiment.

The differences of the seventh embodiment with respect to the operation of the sixth embodiment are that the processing for obtaining the projection affine parameters (step S5112) is added as shown in FIG. 30, and the processing of step S216 is replaced with step S516 as shown in FIG. 31.

Step S5112 is the processing executed after the processing of S4111. Step S5112 is the processing in which the projection affine parameter computing module 560 obtains one projection affine parameter or more for the image projecting module 562 to project a search image on a registered image or to project a registered image on a search image from the vote numbers stored in one vote number storing region or more of the parameter space vote number storage module 546. For example, in step S41111, am, bm, cm, dm, em, and fm as the averages of each affine parameter value voted to one storing region or more used when computing the number of coincidences to be stored in the number-of-coincidences storage module 442 are computed. Thereafter, following computations are done with those values to compute ap, bp, cp, dp, ep, and fp.

$$\begin{pmatrix} ap & bp \\ cp & dp \end{pmatrix} = \begin{pmatrix} am & bm \\ cm & dm \end{pmatrix}^{-1}$$

$$\begin{pmatrix} ep \\ fp \end{pmatrix} = -\begin{pmatrix} am & bm \\ cm & dm \end{pmatrix}^{-1} \begin{pmatrix} em \\ fm \end{pmatrix}$$

This is the necessary processing because am, bm, cm, dm, em, and fm are the parameters showing the transformation from the registered image to the search image (therefore, in a case where the registered image is projected on the search image, it simply needs to be considered as ap=am, bp=bm, cp=cm, dp=dm, ep=em, fp=fm without conducting that computation). There may be prepared a plurality of combinations of the projection affine parameters obtained in this manner for a singe registered image. For example, when there are two or more storing regions (combinations) where the coincident numbers to be stored in the number-of-coincidences storage module 442 are computed, the projection affine parameters corresponding to each of the storing region combinations may be stored.

Referring to FIG. 32, the processing of step S516 is the processing which projects the search image on the registered image (step S5161), checks the projected registered image with the registered image to compute the one indicator or more regarding the similarity in the checking (step S5162), and obtains the identification/search result by using the coincident number stored in the number-of-coincidences storage module 442 and the single indicator or more regarding the similarity, and outputs the result (step S5163).

In step S5161, the image projecting module 562 projects the search image on the registered image.

In step S5162, the similarity (or difference) is computed by a following procedure, for example. First, a common region of the registered image and the projected search image is obtained. The common region is defined to be a common part of the registered image and the projected search image as shown in FIG. 36 (in general, the registered image and the projected search image are not completely identical because of the projection affine parameter estimation error, a difference in cutout regions, and the like). Then, the similarity (difference) regarding pixels belonging to the common region is computed. For example, the similarity (difference) that is the sum of square values of (pixel value of registered image—pixel value of corresponding projected search image) is computed. Further, it is also possible to divide the common region to n×n pieces of block regions, and adds the square values of the differences acquired from the values of each block to obtain the similarity (difference). The method for obtaining the similarity (difference) is not limited only to those, but existing methods can also be employed. Further, it is also possible to take two or more values as the similarity.

In step S5163, the registered image to be outputted is determined based on the coincident number stored in the number-of-coincidences storage module 442 and the similarity computed in step S5162, and outputted. The registered image to be outputted is determined by utilizing the fact that the more coincident numbers are better and the smaller similarity (larger difference) is better theoretically.

Next, another example of the seventh embodiment will be described. This example is a more detailed example of the simple example of the seventh embodiment.

First, referring to FIG. 33, the outline of the structure will be described. In this another example of the seventh embodiment, an image projecting module 662 is formed with a partial region computing module 672, a partial region feature amount computing module 674, a partial region feature amount storage module 676, and a projected region computing module 678. Further, a projected image checking module 664 is formed with a projected region image feature amount computing module 680 and a partial region coincidence judging module 682. The structural elements other than those are the same as those of the simple example of the seventh embodiment.

Next, functions of each structural element will be described. Hereinafter, explanations are provided by referring to the case where the search image is projected on the registered image. However, it is to be noted that the case of projecting the registered image on the search image is substantially the same.

The partial region computing module 672 computes one partial region or more from the registered image. For example, after binarizing the registered image, the connection region may be obtained, and the connection region or circumscribed rectangle or the like may be taken as the partial image. A case where the binarization processing, processing for obtaining the connected region, and the like are executed by the registered image feature point extracting module 612 is preferable, since the computation result of the registered image feature point extracting module 612 or at least a part of the values obtained in the process of the computation can be reutilized. Normally, a plurality of connection regions are obtained from a character string image, so that a part of or a whole part of the connection regions are computed as the partial regions.

The partial region feature amount computing module 674 computes the feature amounts (partial region feature amounts) regarding the partial regions computed from the registered image. In a case where the connection region is employed as the partial region, the number of pixels constituting the connected region, the sum of the pixel values before being binarized regarding the pixels constituting the connection region, and the like can be considered as the feature amounts. Here, when the sum of the number of the pixels constituting the connection region is computed by the registered image feature point extracting module 612, the result can also be reutilized. Further, in a case where the circumscribed rectangle of the connection component is employed as the partial region, abundance ratio of black pixels within the circumscribed rectangle (number of black pixels/number of pixels in circumscribed rectangle) or the known feature amount used in character recognition can be used as the feature amount.

The partial region feature amount storage module 676 stores partial region information computed by the partial region computing module 672 and the partial region feature amount computed by the partial region feature amount computing module 674.

The projected region computing module 678 computes the partial region in the search image to be projected on the registered image by using the projection affine parameter computed by the projection affine parameter estimating module 660 and the partial region information stored in the partial region feature amount storage module 676. For example, in a case where the image itself constituted with the connection component is used as a partial region, the region in the search image where partial region of the registered image is projected is determined as the region projected on the registered image. In a case where the circumscribed rectangle is employed as the partial region, it is possible to project only the circumscribed rectangle information instead of projecting all the pixels in the partial region image of the registered image. There is also considered a case where the projected region becomes protruded from the registered image. In that case, however, such partial region can be excluded from the target of judgment regarding coincidence of the partial region described later.

The projected region image feature amount computing module 680 is the processing for computing the feature amount (projected region image feature amount) within the partial region that is to be projected on the registered image computed by the projected region computing module 678. In general, it is achieved by a procedure which projects the partial region image of the search image obtained by the projected region computing module 678 on the registered image, and then computes the image feature amount for the projected image. However, considering that there is affine transformation between the registered image and the search image, it is possible to compute the feature amount without actually projecting the partial region image of the search image on the registered image. For example, in a case where the circumscribed rectangle of the connection region is used as the partial region and the abundance ratio of black pixels within the circumscribed rectangle is used as the feature amount, the abundance ratio of the black pixels within the circumscribed rectangle may be computed within the region (square region) which is obtained by transforming the circumscribed rectangle in the registered image with the affine transformation in the manner described above.

Through the effect of the projected region image feature amount computing module 680, there is obtained the feature amount of the partial region on the search mage corresponding to each partial region of the registered image whose feature amount stored in the partial region feature amount storage module 676 is computed.

The partial region coincidence judging module 682 judges whether or not the partial regions match with each other by checking the partial region feature amount regarding the registered image stored in the partial region feature amount storage module 676 with the projected region image feature amount regarding the search image computed by the projected region image feature amount computing module 680. Thereafter, by using the coincident number, (the number judged as being coincident among the partial regions)/(the number of times the coincidence judgment is conducted) or the like is computed as the similarity, and the value thereof is outputted. For checking whether or not the partial regions match, the partial regions may be compared with an existing method. For example, when the feature amounts are expressed with scalars, it can be judged as being coincident when the difference between the both or the value of (partial region feature amount computed from the registered image)/ (projected region image feature amount computed from the search image) is within a range that is set in advance. When the feature amounts are expressed with vectors, it can be judged as being coincident when the square sum of error of both vectors, distance (cityblock distance, Euclidean distance, or the like), inner product or the like is within a range that is set in advance. It is also possible to set other matching conditions by considering the characteristics of the checking targets. The number of matching partial regions is also computed by the partial region coincidence judging module 682.

Next, operations will be described. Compared with a simple example of a thirteenth embodiment, it is only different in respect that the processing of step S516 is replaced with step S616 as shown in FIG. 34. Hereinafter, step S616 will be described.

Now, the operations of step S616 will be described by referring to FIG. 35. First, initialization is conducted. Specifically, in order to compute the number of matching partial regions for each registered image RIz, the number-of-coincidences storing counter of the partial region corresponding to the registered image RIz is initialized to "0" (step S61600).

In step S61601, the partial region computing module 672 computes the partial region from the registered image RIz. Then, the partial region feature amount computing module 674 computes the feature amount for the partial region rrid computed from the registered image RIz (step S61602), and the computed region is stored in the partial region feature amount storage module 676 (step S61603). The processing of step S61602 and step S61603 needs to be done for all the partial regions computed from the registered image RIz, so that it is judged in step S61604 whether or not the feature amounts for all the partial regions computed from the registered image RIz are computed and stored. If the feature amounts for all the partial regions are not computed, the processing returns to step S61602. When judged as being computed, the processing advances to step S61605. In step S61605, it is judged whether or not the partial region feature amounts are computed for all the registered images. When judged that the computations are not completed, the processing returns to step S61602. When judged that the computations are completed, the processing advances to step S61606.

In step S61606, the projected region computing module 678 obtains the partial region in the search image corresponding to the partial region rrid computed from the registered image RIz. Then, in step S61607, the projected region image feature amount computing module 680 projects the image within the partial region of the search image computed in step S61606 on the registered image. As has been described in the explanation of the projected region image feature amount computing module 680, the processing of step S61607 may be omitted. Then, in step S61608, the feature amount is computed from the partial region in the search image computed in S61606 or the image that is obtained by projecting the image within the partial region of the search image computed in S61607 on the registered image.

In step S61609, the partial region coincidence judging module 682 judges whether or not the partial region feature amount match with the projected region image feature amount. When judged as being coincident, the number-of-coincidences storing counter of the partial region corresponding to the registered image RIz is increased by 1 in step S61610. Thereafter, the processing advances to step S61611. When judged as being unmatched, the processing advances to S61611 directly.

In step S61611, it is judged whether or not coincidence judgment regarding the partial region feature amounts is completed for all the partial region computed from the registered image RIz. If the feature amounts for all the partial regions are not computed, the processing returns to step S61606. When judged as computed, the processing advances to step S61612.

In step S61612, it is judged whether or not judgment partial region feature amounts regarding all the registered images is completed. When judged as not computed, the processing returns to step S61606. When judged as computed, the processing advances to step S61613.

In step S61613, the partial region coincidence judging module 682 computes the similarity for each registered image.

At last, in step S61614, the registered image that is to be taken as the identification result at last is obtained by utilizing the coincident numbers stored in the number-of-coincidences storage module 642 and the similarity computed by the partial region coincidence judging module 682, and information designating the registered image uniquely is outputted.

The operations of another example of the seventh embodiment described above are not necessarily need to be executed in that order. For example, the processing of step S61601, step S61602, step S61603, step S61604, and step S61605 can be executed in the registering processing shown in FIG. 4. Alternatively, the processing executed in a loop of step S61611 and step S61612 may be executed in a loop of step S61606, step S61607, step S61608, step S61609, step S61610, step S61604, and step S61605 altogether. Inversely, a series of processing may be executed by dividing the processing from step S61606 to step S61608 and processing from step S61609 to step S61610, and executing each divided processing as loop-processing corresponding to step S61611 and step S61612.

As another example of the seventh embodiment, there has been described the mode which projects a search image on a registered image. As described above, however, it is possible to project a registered image on a search image, or to use both methods together. In a case where the both methods are used, the image checking result computing module 544 may judge the final result from the similarities and the coincident numbers, which are acquired respectively from the both methods.

As has been described above, there are following effects obtained with the seventh embodiment. That is, the checking principle based on the feature vector coincident number which has been described above can be expected to be done with still high precision through utilizing it in combination with the checking principle of the image checking device which projects the image as a means used for the checking. In particular, the structure including the image checking device using the feature vector coincident number as the first checking principle, the structure for obtaining the affine parameters for projection can be formed efficiently. Therefore, it is advantageous that the second checking principle can be employed with a low resource.

Further, as has already been described, another example of the seventh embodiment can also provide the effect of omitting a part of computations that are to be conducted by the partial region computing module by utilizing at least a part of the values acquired in the process of computations conducted by the registered image feature point extracting module. Further, the affine parameter estimation conducted by the affine parameter estimating section is done based on the local feature point arrangement as has been described above. Thus, the embodiment is capable of projecting local image with local affine parameters in a case where the entire image cannot be expressed with uniform affine parameters, which is effective. In the meantime, even when the entire image can be expressed with the uniform affine parameters but the local affine parameter cannot be obtained due to some kind of influences such as computation errors, the local affine parameter can be estimated from the affine parameters obtained in the regions other than that region. Therefore, the embodiment is effective.

Other structures, other steps, and the operational effects thereof are the same as the case of the first embodiment or the twelfth embodiment described above. The operation contents of each of the steps and the structural elements of each component described in the above explanations may be put into programs to be executed by a computer. Alternatively, all of the operation contents of each of the above-described steps and the structural elements of each component described in the above may be structured with hardware to be executed with the hardware. Further, a part of the operation contents of each of the steps and the structural elements of each component described in the above may be structured with hardware, and the remaining structural elements may be put into programs to be executed with the hardware and a computer in cooperation.

INDUSTRIAL APPLICABILITY

The present invention makes it possible to check the feature point arrangement acquired from an image or the image itself, so that it can be applied for searching and identifying the images. Particularly, the present invention can be applied to searching and identification of document (character string) image from which relatively a large amount of feature points can be obtained stably.

BRIEF DESCRIPTION OF THE DRAWINGS

FIG. 10 is an explanatory illustration for describing an example of a registered image RI1 which is registered in the image checking device of FIG. 1;

Figure 12:
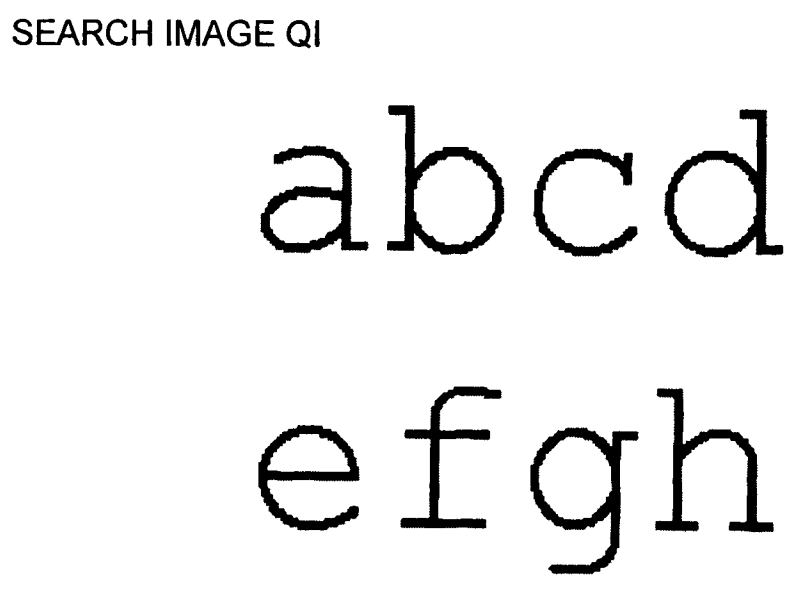

FIG. 12 is an explanatory illustration for describing an example of a search image QI which is searched in the image checking device of FIG. 1;

FIG. 14 is an explanatory chart for describing examples of feature point coordinates regarding the registered image R11 which is registered in the image checking device of FIG. 1;

FIG. 15 is an explanatory chart for describing examples of feature point combination result regarding the registered image RI2 which is registered in the image checking device of FIG. 1, and storing result of the feature vectors as the affine invariants of the feature points;

FIG. 16 is an explanatory chart for describing examples of relevancy between the feature vector element numbers and the feature point numbers used for computing the affine invariants regarding generations of the feature vectors in the image checking device of FIG. 1;

FIG. 17 is an explanatory chart for describing examples of feature point combination result regarding the registered image RI1 which is registered in the image checking device of FIG. 1, and storing result of the feature vectors as the affine invariants of the feature points;

FIG. 19 is an explanatory chart for describing examples of feature point coordinates regarding the registered image RI2 which is registered in the image checking device of FIG. 1;

FIG. 20 is an explanatory chart for describing examples of feature point coordinates regarding the search image QI which is searched in the image checking device of FIG. 1;

REFERENCE NUMERALS

Figure 1:
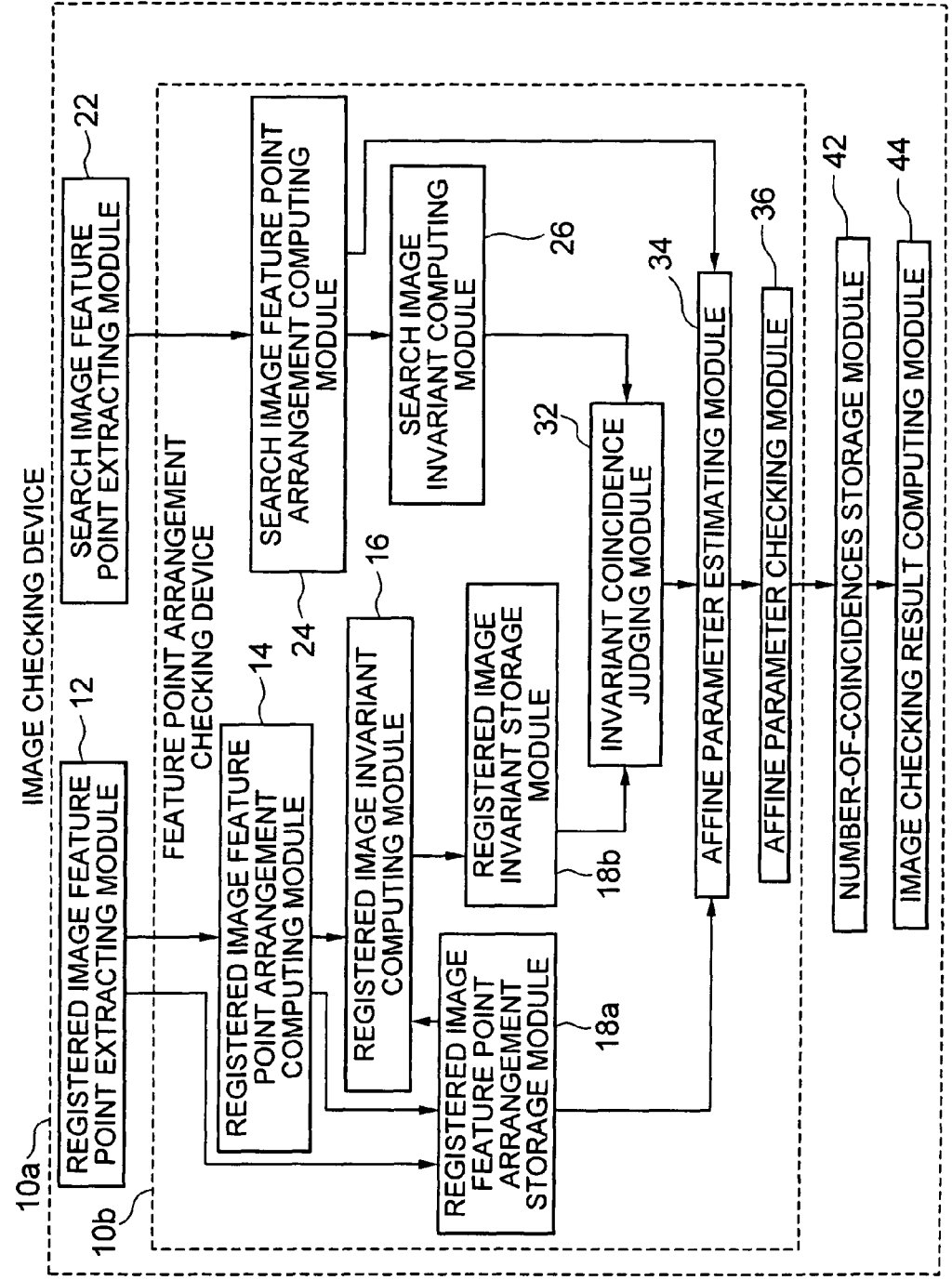
FIG. 1 is a block diagram showing an example of the entire structure of a first embodiment in which a feature point checking device of the present invention is applied to an image checking device.
Figure 2:
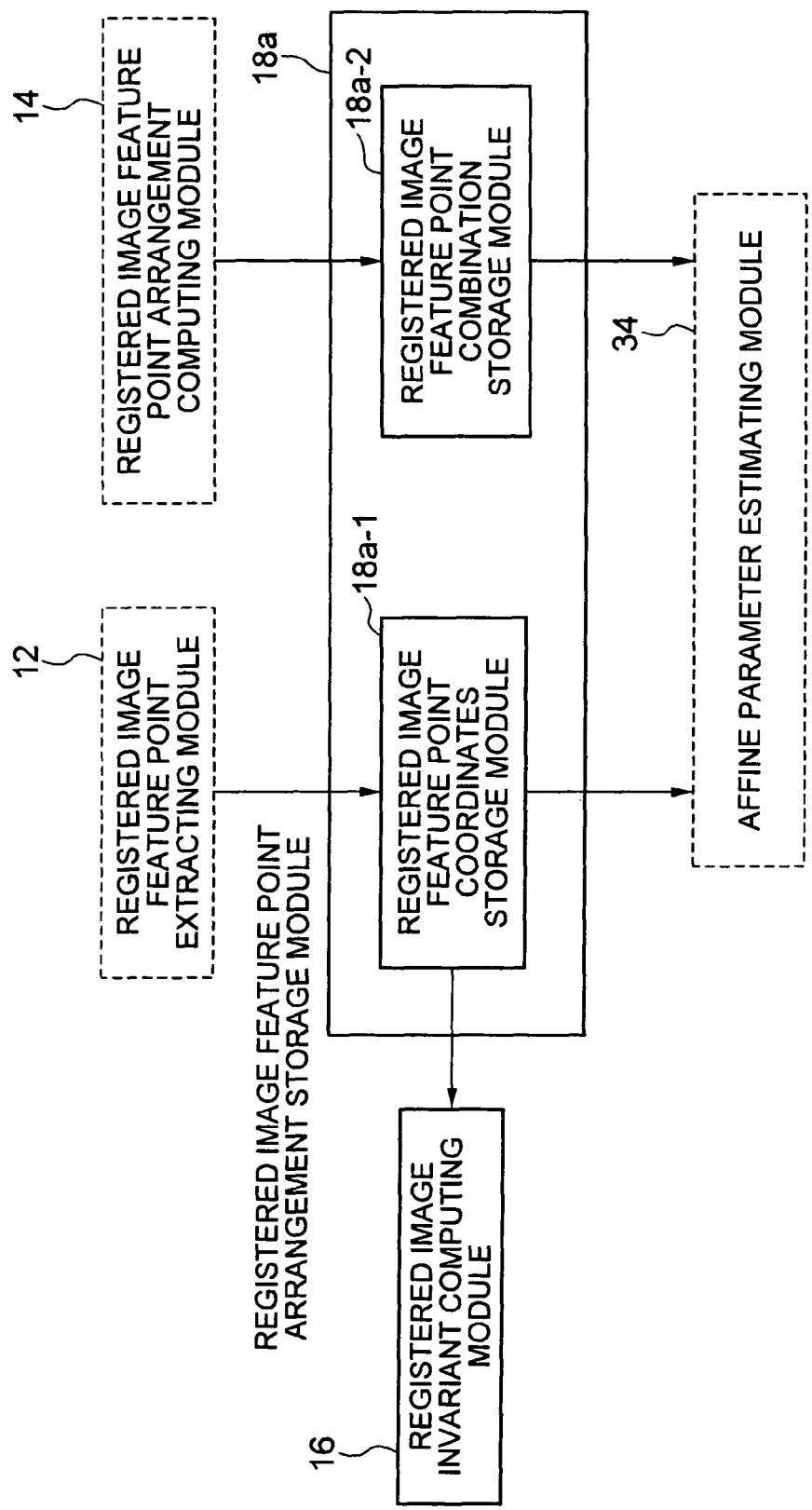
FIG. 2 is a block diagram showing detailed structure of a part of the image checking device shown in FIG. 1.
Figure 3:
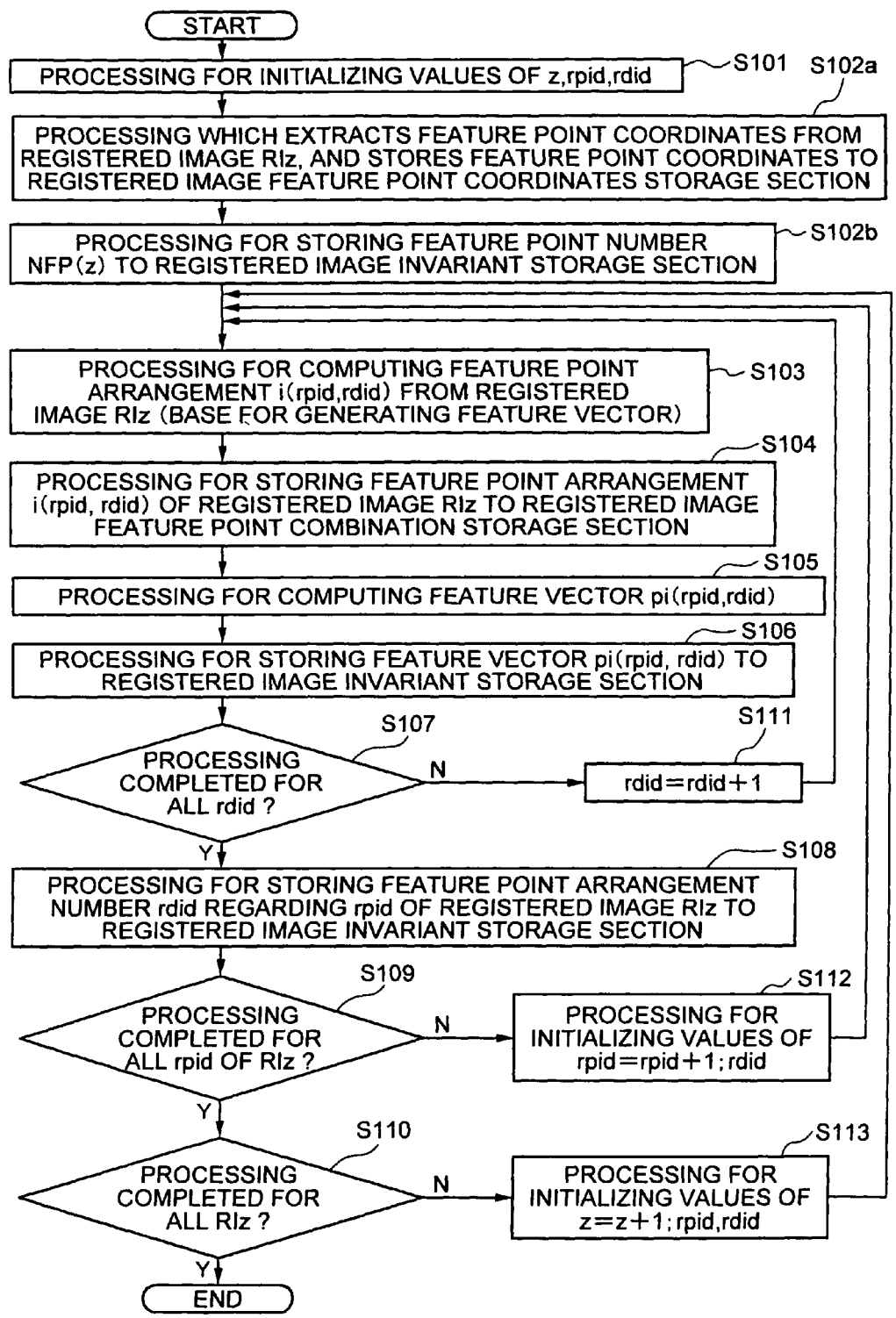
FIG. 3 is a flowchart showing an example of a registering processing procedure of the image checking device of the first embodiment in which the feature point checking device of the present invention is applied to the image checking device.
Figure 4:
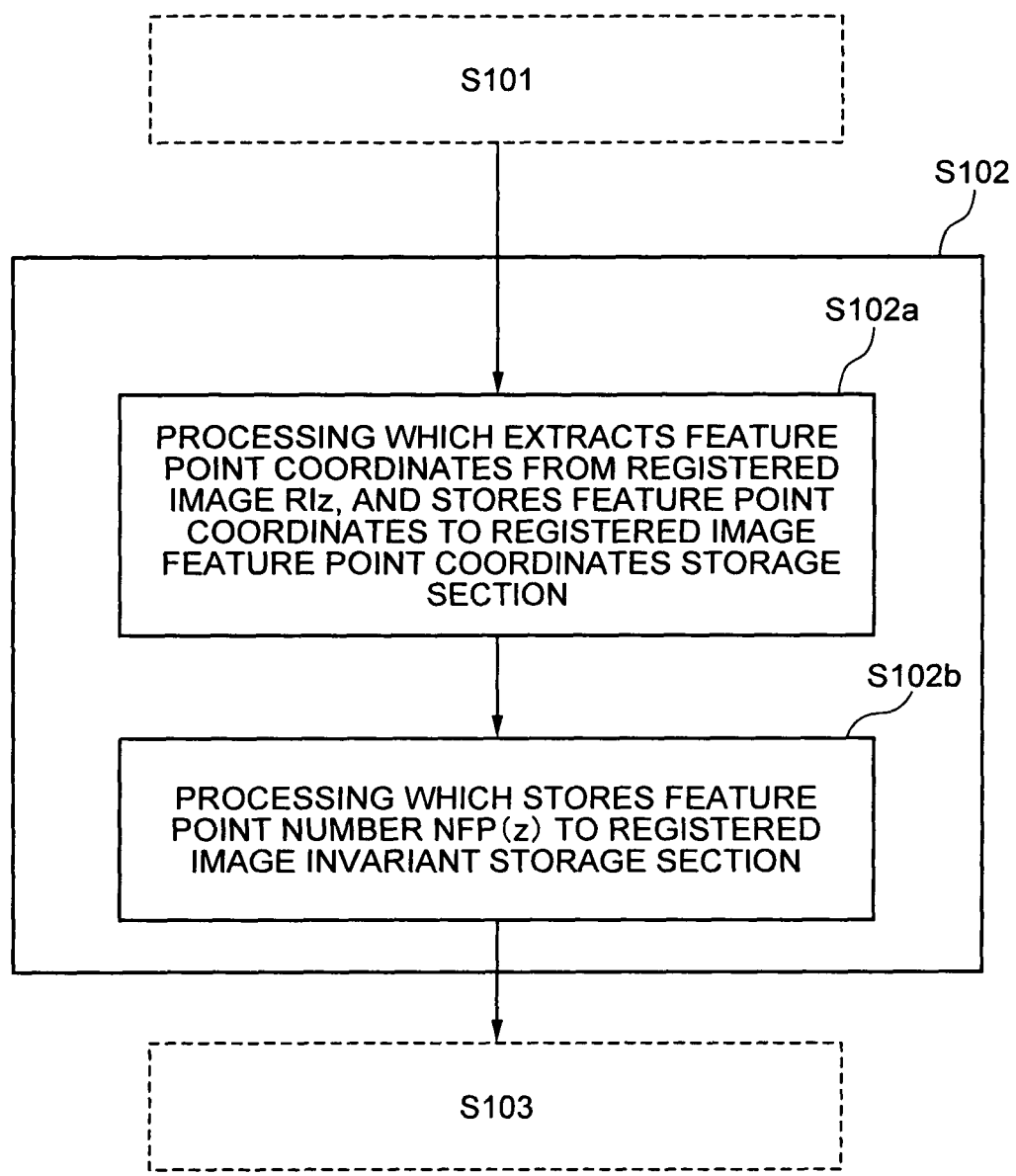
FIG. 4 is a flowchart showing an example of detailed processing of a part of the registering processing procedure shown in FIG. 3.
Figure 5:
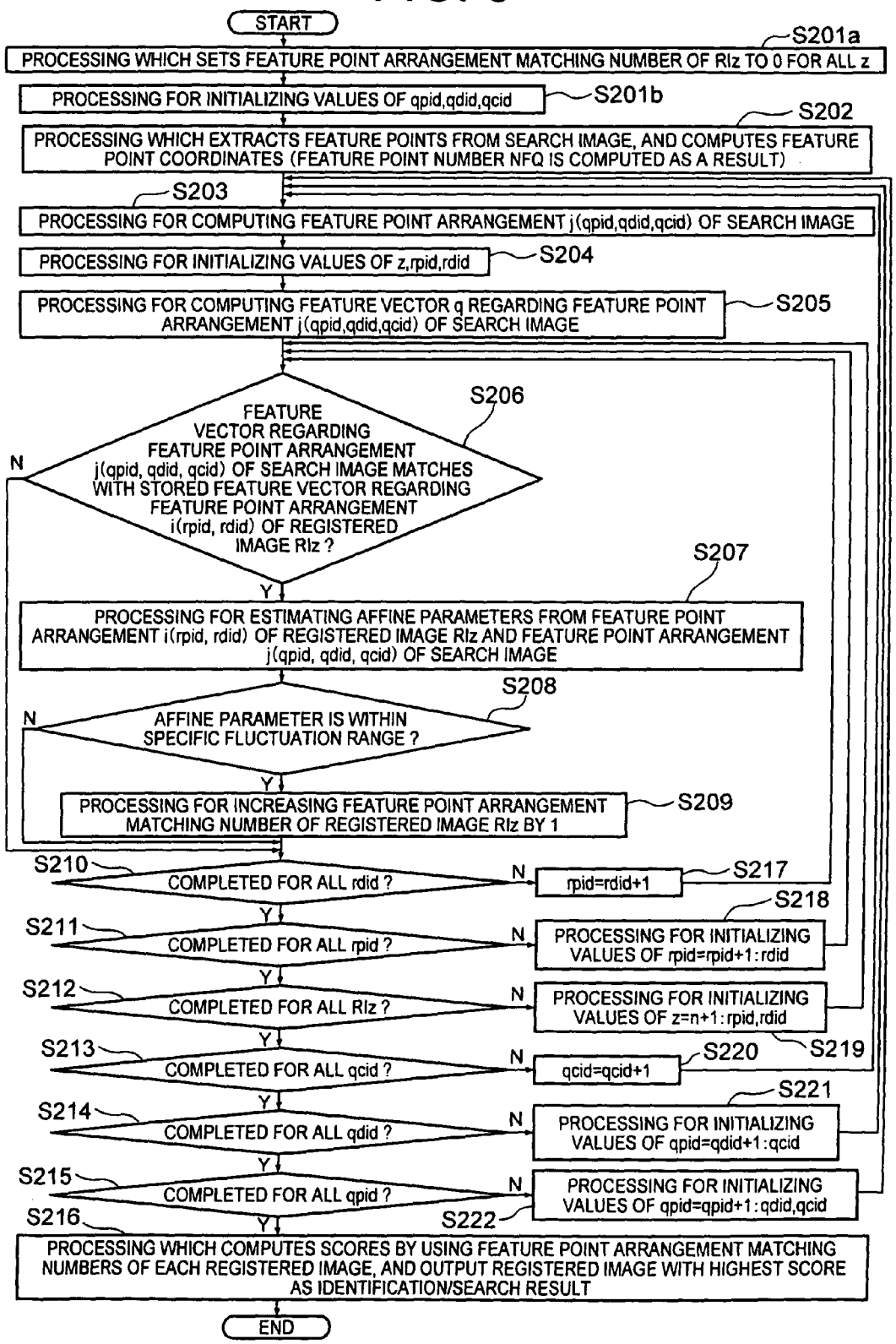
FIG. 5 is a flowchart showing an example of a searching processing procedure of the image checking device of the first embodiment in which the feature point checking device of the present invention is applied to the image checking device.
Figure 6:
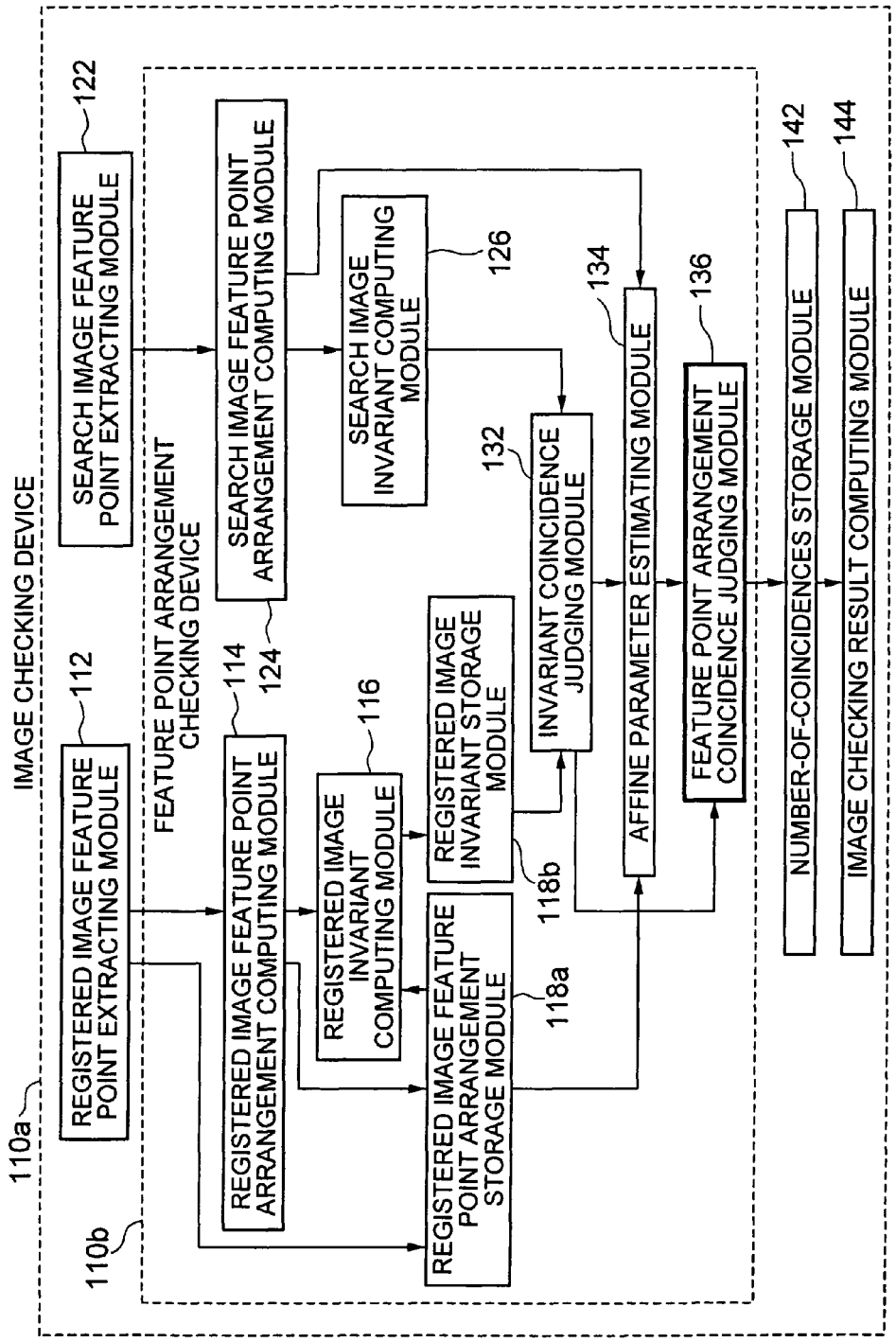
FIG. 6 is a block diagram showing an example of the entire structure of a second embodiment in which a feature point checking device of the present invention is applied to an image checking device.
Figure 7:
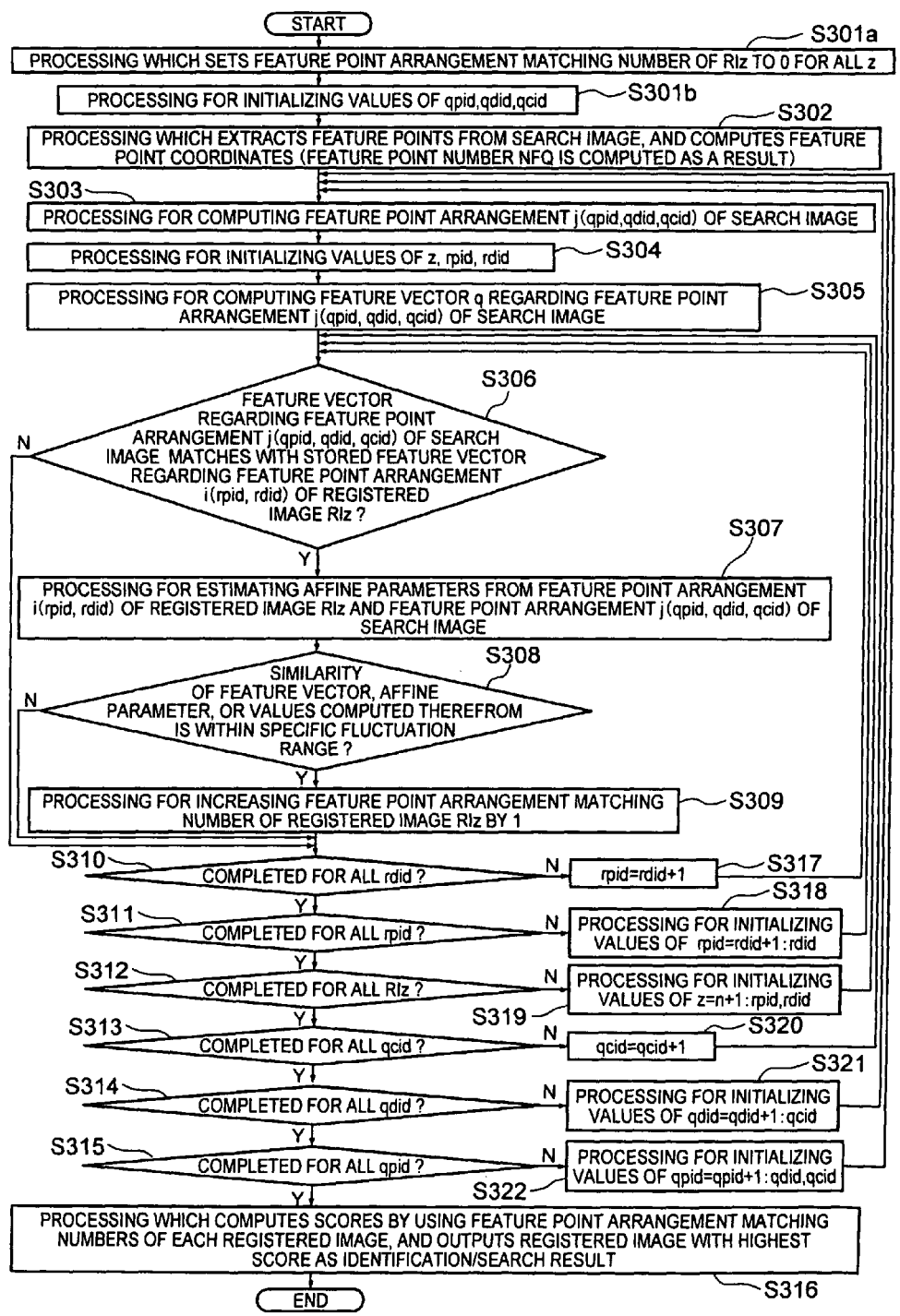
FIG. 7 is a flowchart showing an example of a searching processing procedure of the image checking device of the second embodiment in which the feature point checking device of the present invention is applied to the image checking device.
Figure 8:
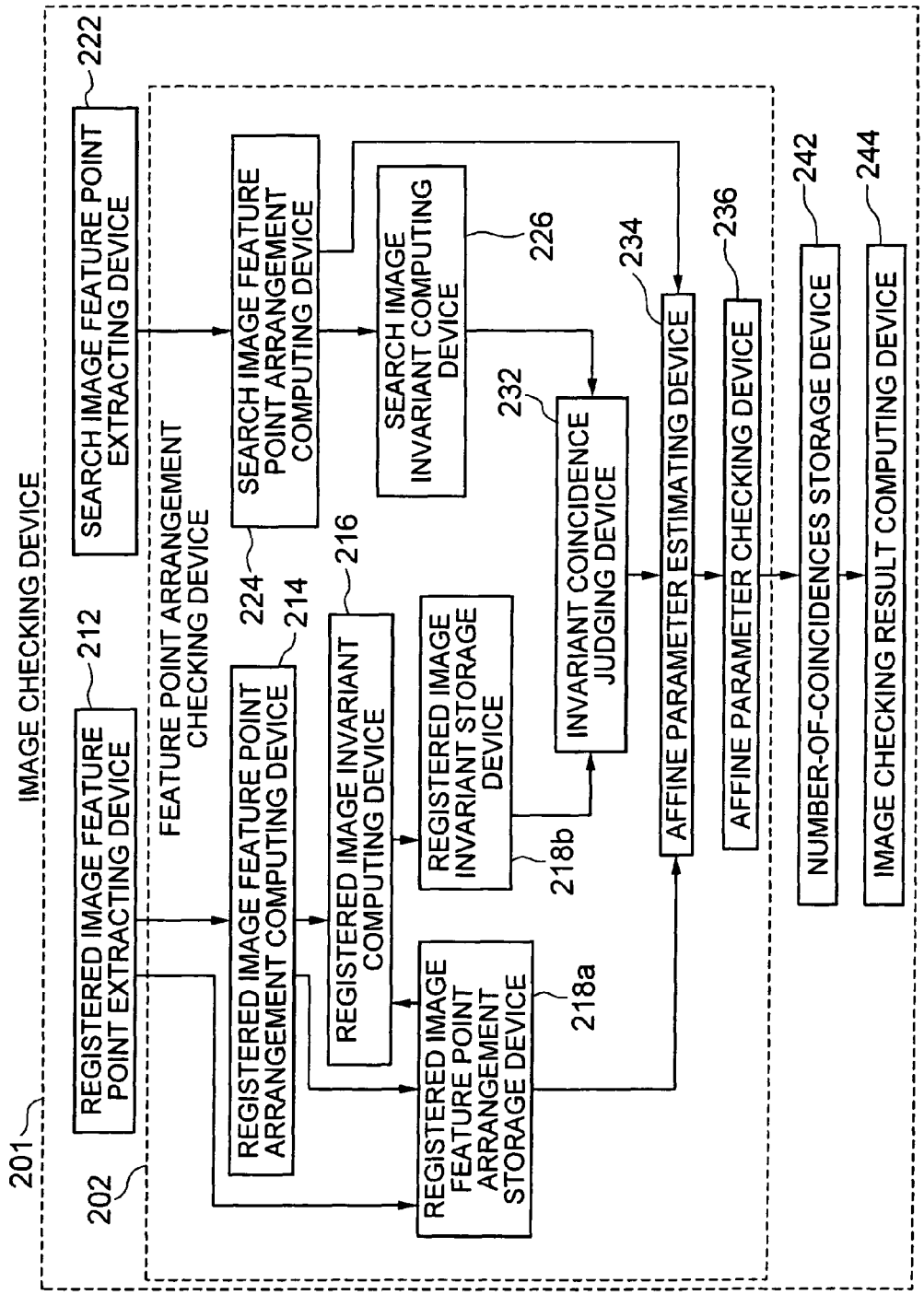
FIG. 8 is a block diagram showing an example of the entire structure of a third embodiment in which a feature point checking device of the present invention is applied to an image checking device.
Figure 9:
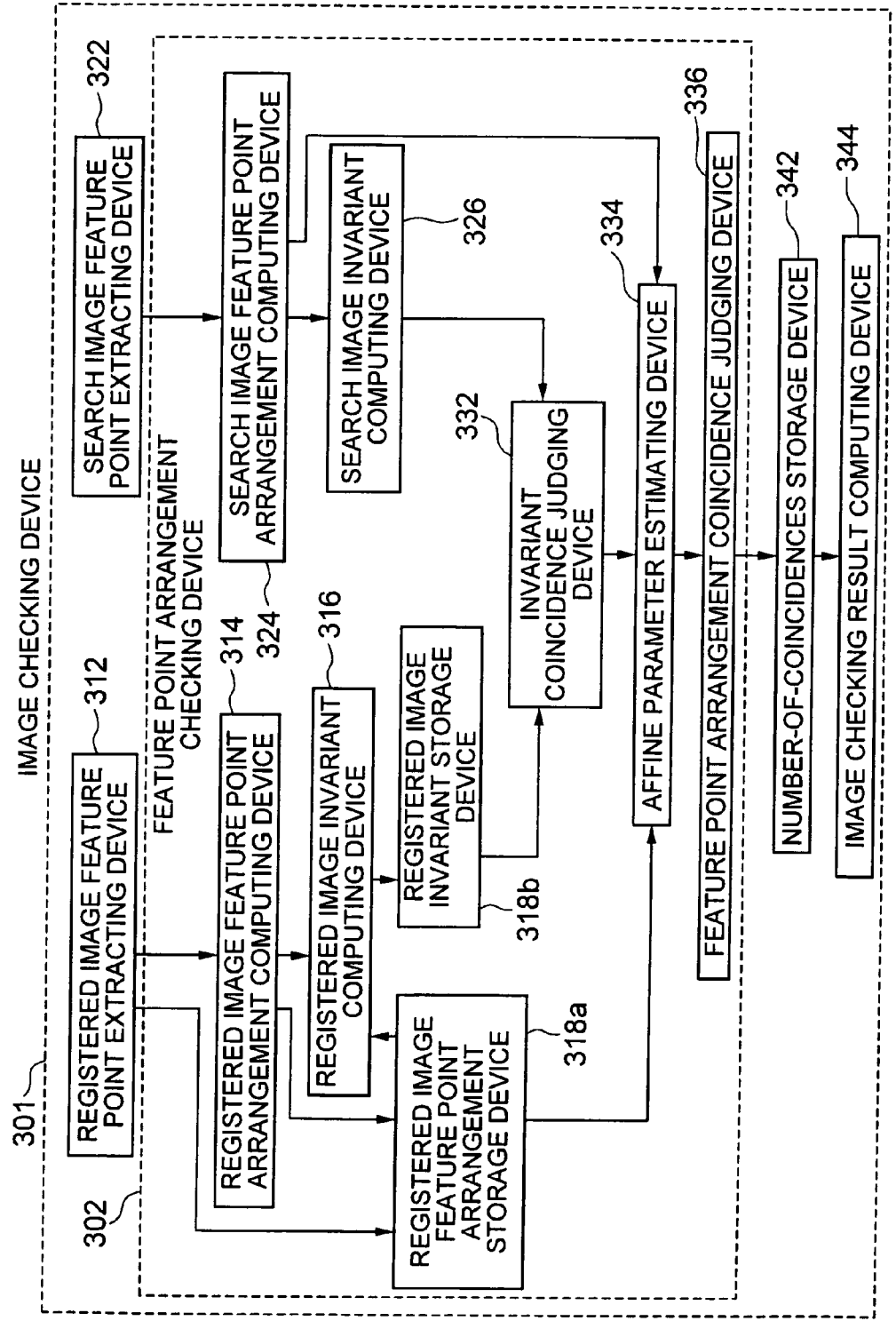
FIG. 9 is a block diagram showing an example of the entire structure of a fourth embodiment in which a feature point checking device of the present invention is applied to an image checking device.
Figure 11:
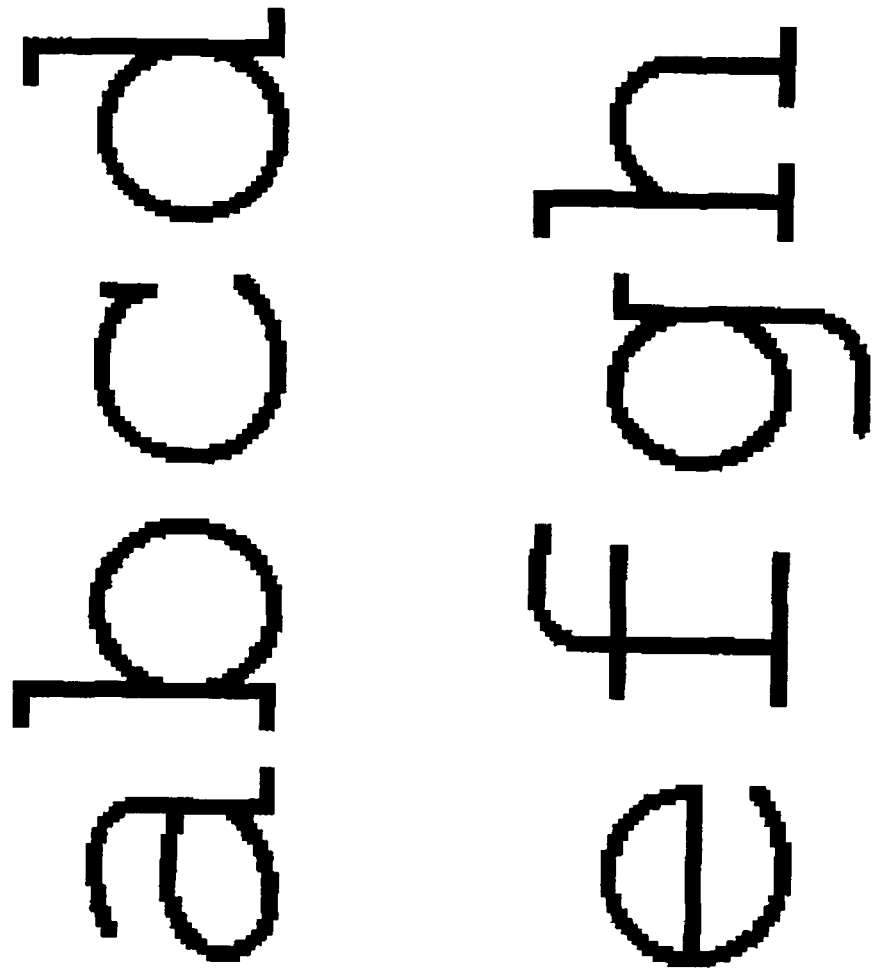
FIG. 11 is an explanatory illustration for describing an example of a registered image RI2 which is registered in the image checking device of FIG. 1.
Figure 13:
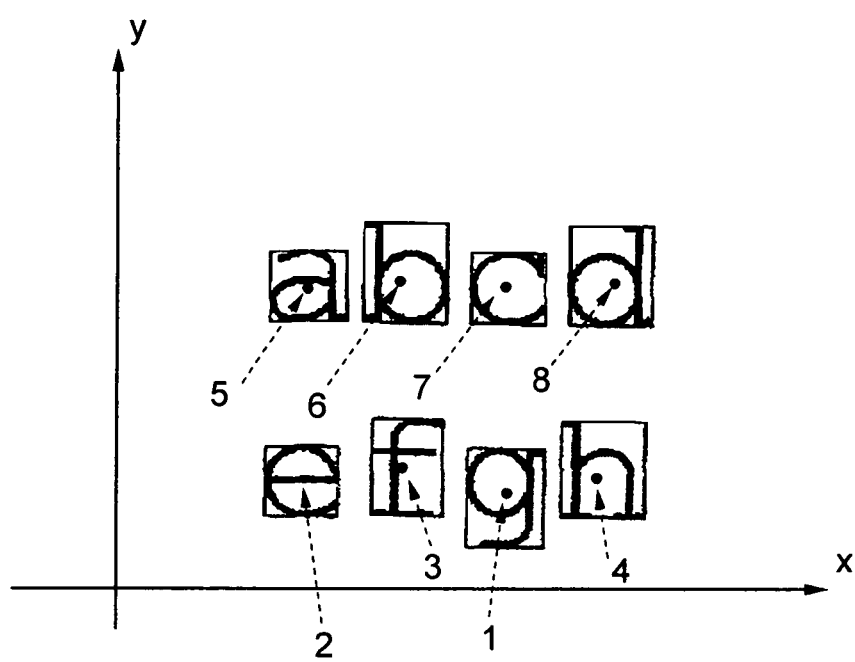
FIG. 13 is an explanatory illustration for describing an extraction example of feature points regarding the registered image RI1 which is registered in the image checking device of FIG. 1.
Figure 18:
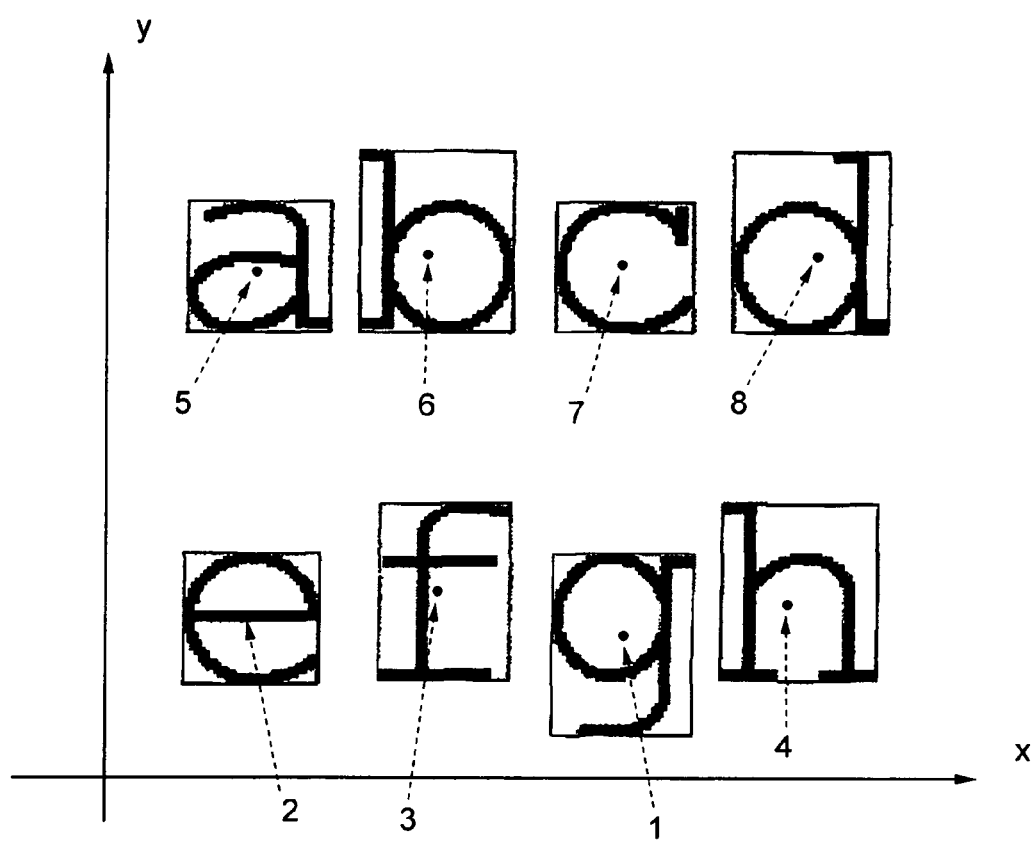
FIG. 18 is an explanatory illustration for describing an extraction example of feature points regarding the registered image RI2 which is registered in the image checking device of FIG. 1.
Figure 21:
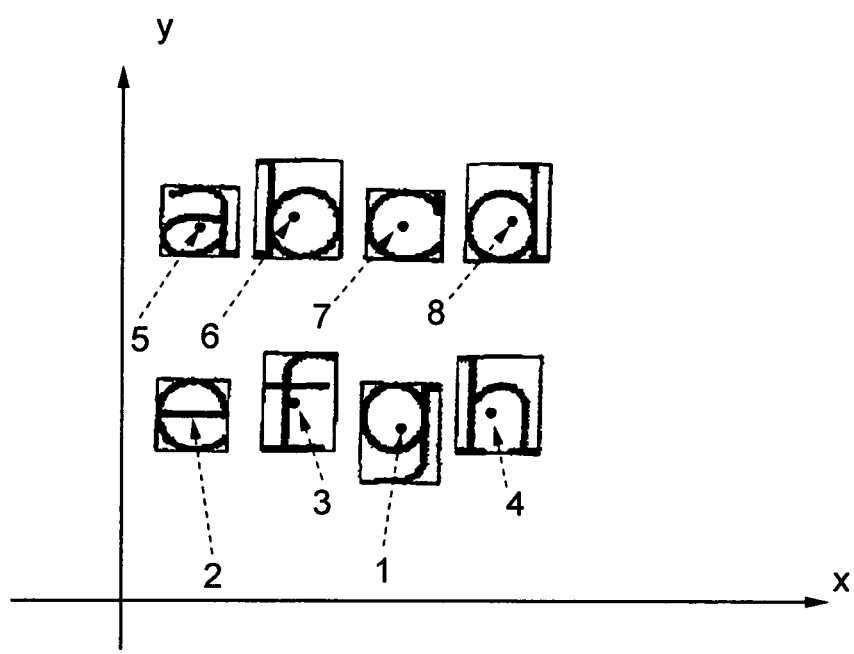
FIG. 21 is an explanatory illustration for describing an extraction example of feature points regarding the search image QI which is searched in the image checking device of FIG. 1.
Figure 22:
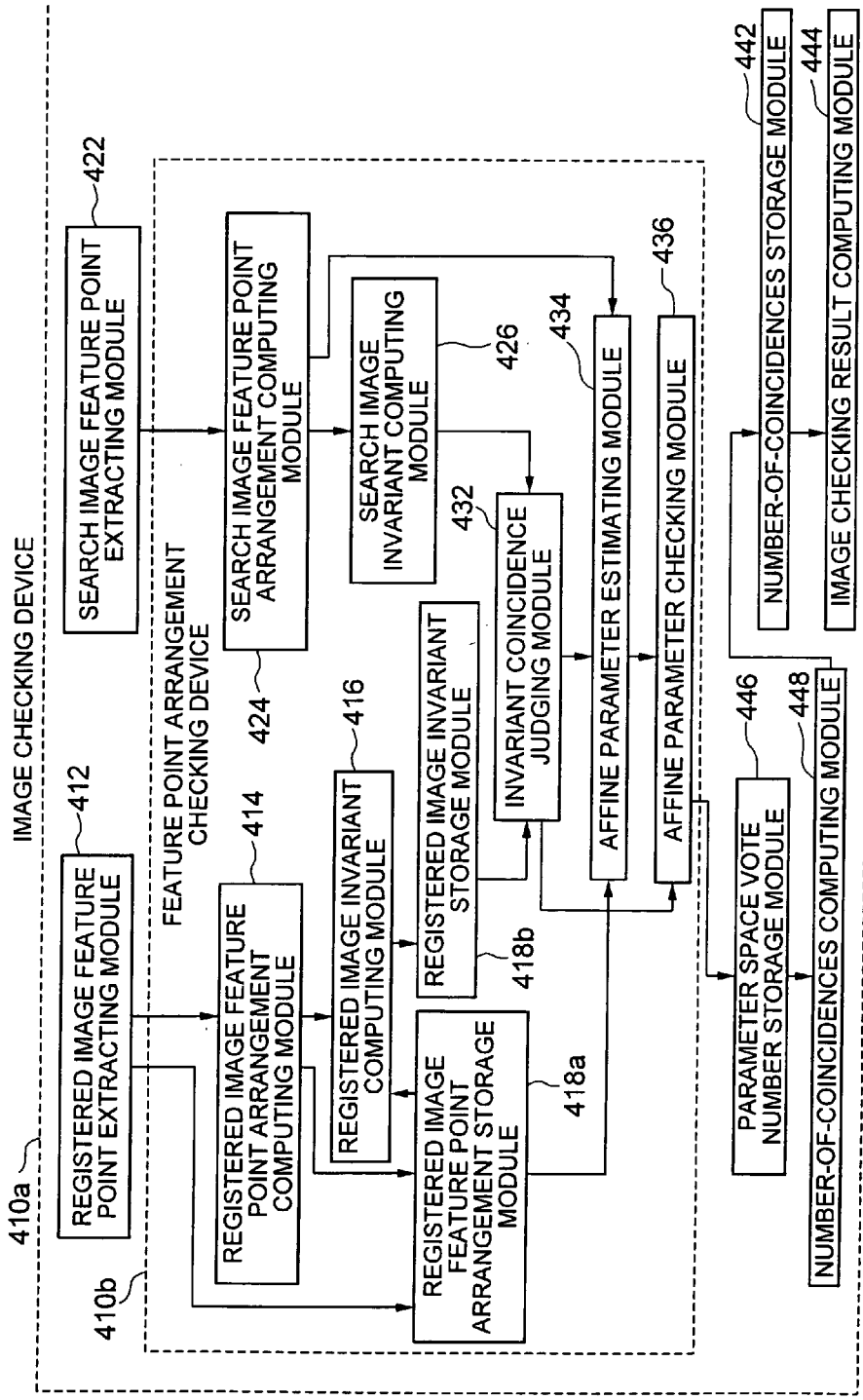
FIG. 22 is a block diagram showing an example of the entire structure of a twelfth embodiment in which a feature point checking device of the present invention is applied to an image checking device.
Figure 23:
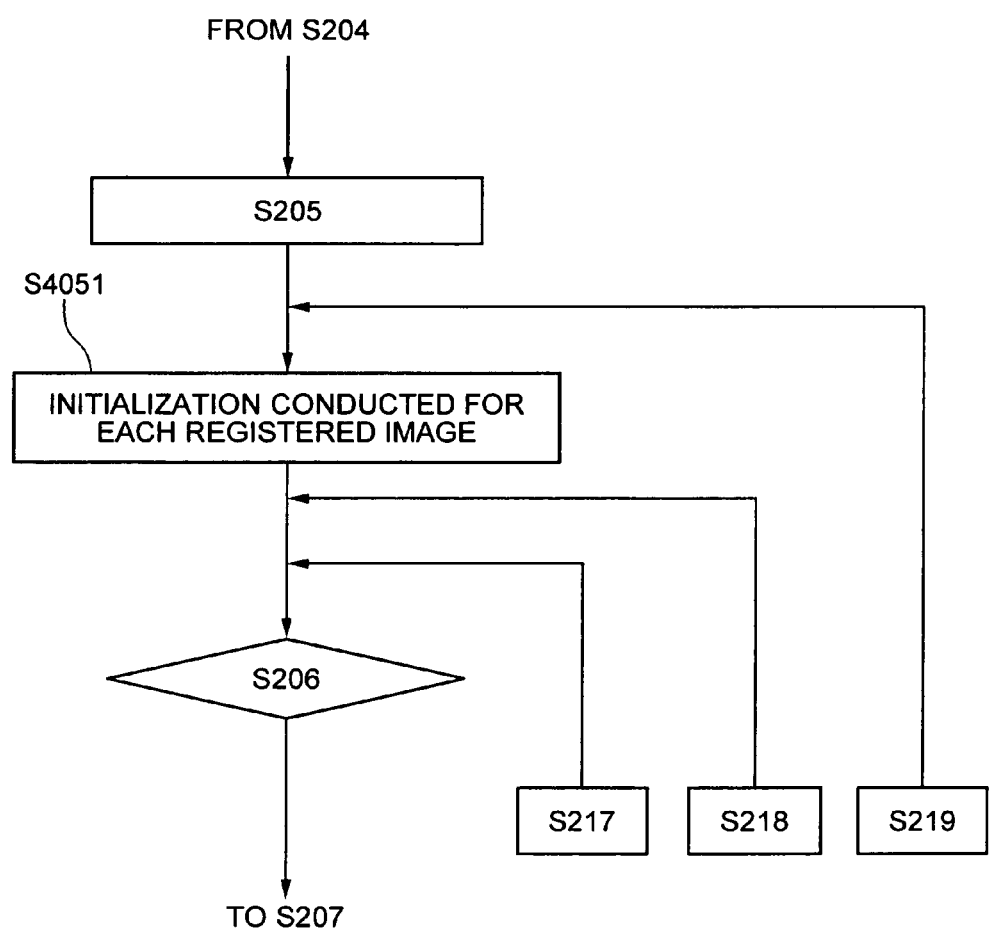
FIG. 23 is a flowchart showing an example of a detailed processing procedure of a searching processing procedure of the image checking device of the twelfth embodiment in which the feature point checking device of the present invention is applied to the image checking device.
Figure 24:
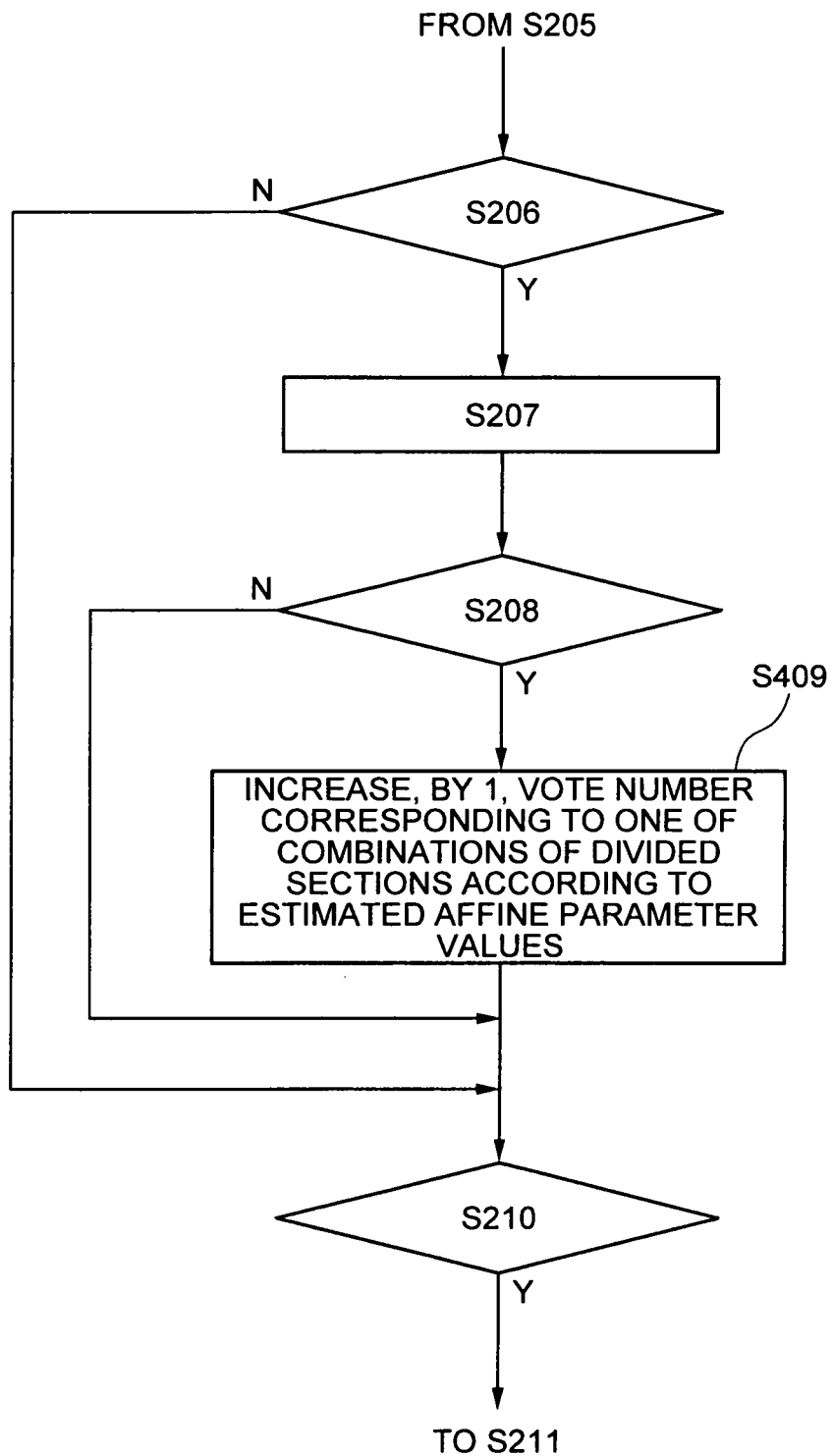
FIG. 24 is a flowchart showing an example of a detailed processing procedure of the searching processing procedure of the image checking device of the twelfth embodiment in which the feature point checking device of the present invention is applied to the image checking device.
Figure 25:
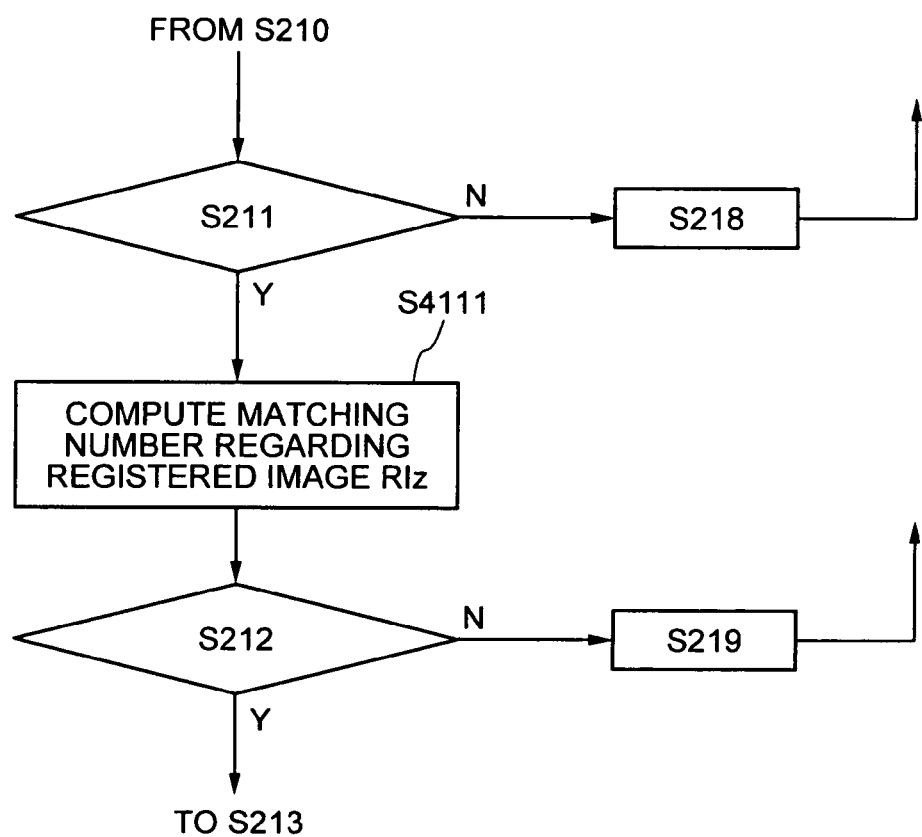
FIG. 25 is a flowchart showing an example of a detailed processing procedure of the searching processing procedure of the image checking device of the twelfth embodiment in which the feature point checking device of the present invention is applied to the image checking device.
Figure 26:
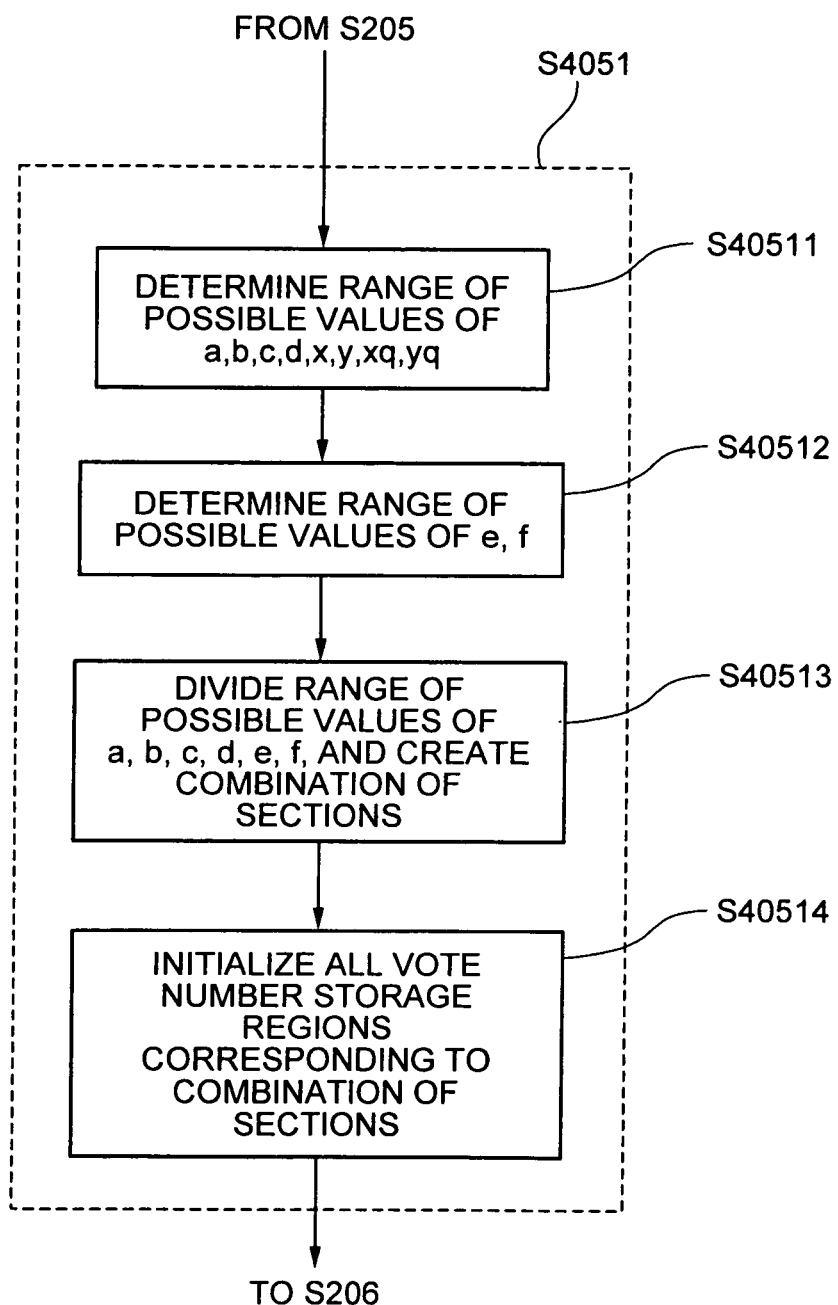
FIG. 26 is a flowchart showing an example of a detailed processing procedure of the searching processing procedure of the image checking device of the twelfth embodiment in which the feature point checking device of the present invention is applied to the image checking device.
Figure 27:
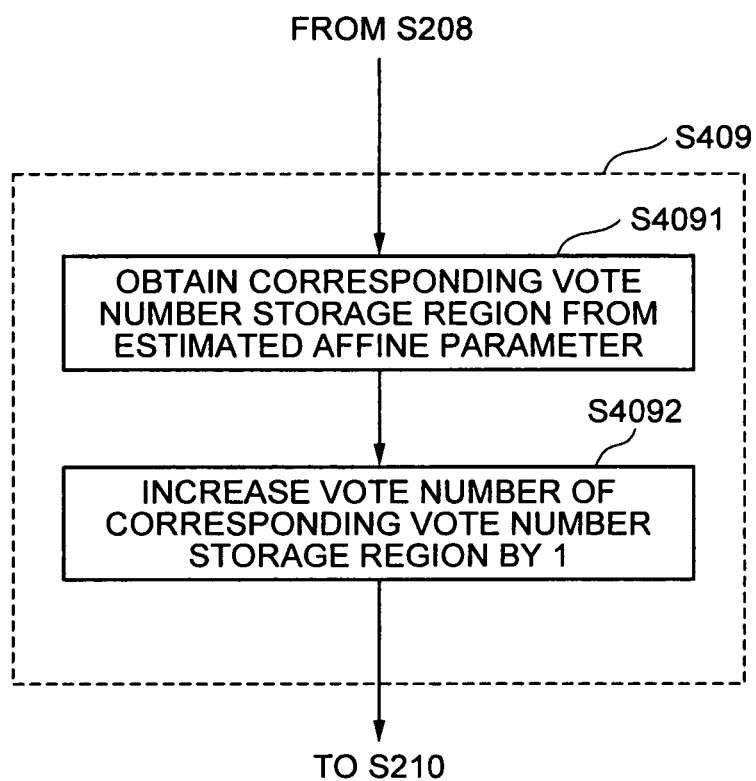
FIG. 27 is a flowchart showing an example of a detailed processing procedure of the searching processing procedure of the image checking device of the twelfth embodiment in which the feature point checking device of the present invention is applied to the image checking device.
Figure 28:
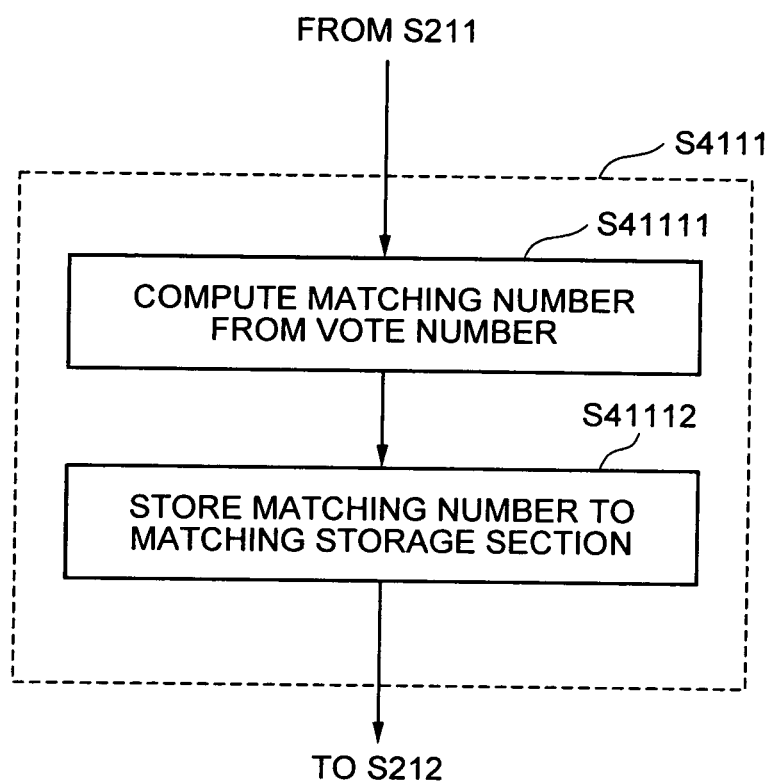
FIG. 28 is a flowchart showing an example of a detailed processing procedure of the searching processing procedure of the image checking device of the twelfth embodiment in which the feature point checking device of the present invention is applied to the image checking device.
Figure 29:
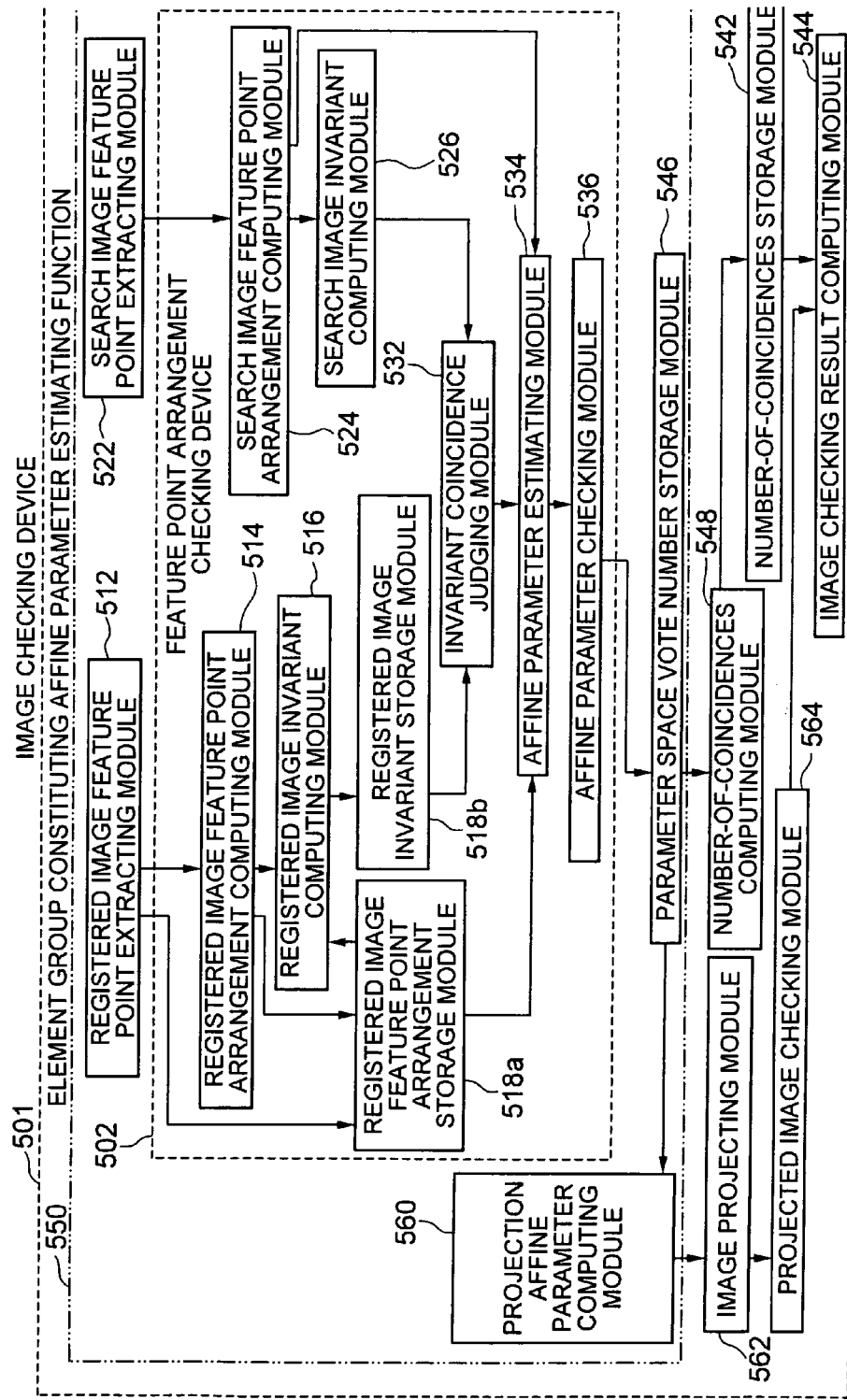
FIG. 29 is a block diagram showing an example of the entire structure of a thirteenth embodiment in which a feature point checking device of the present invention is applied to an image checking device.
Figure 30:
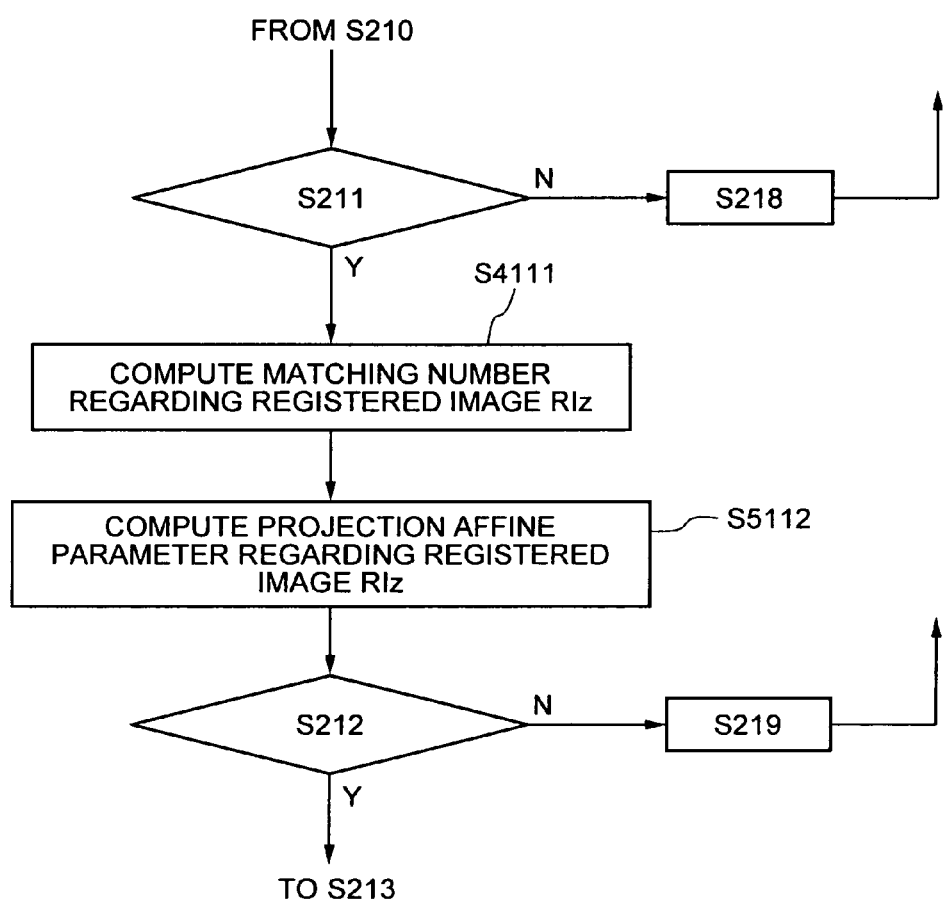
FIG. 30 is a flowchart showing an operation example of processing for obtaining a projection affine parameter in the thirteenth embodiment in which the feature point checking device of the present invention is applied to the image checking device.
Figure 31:
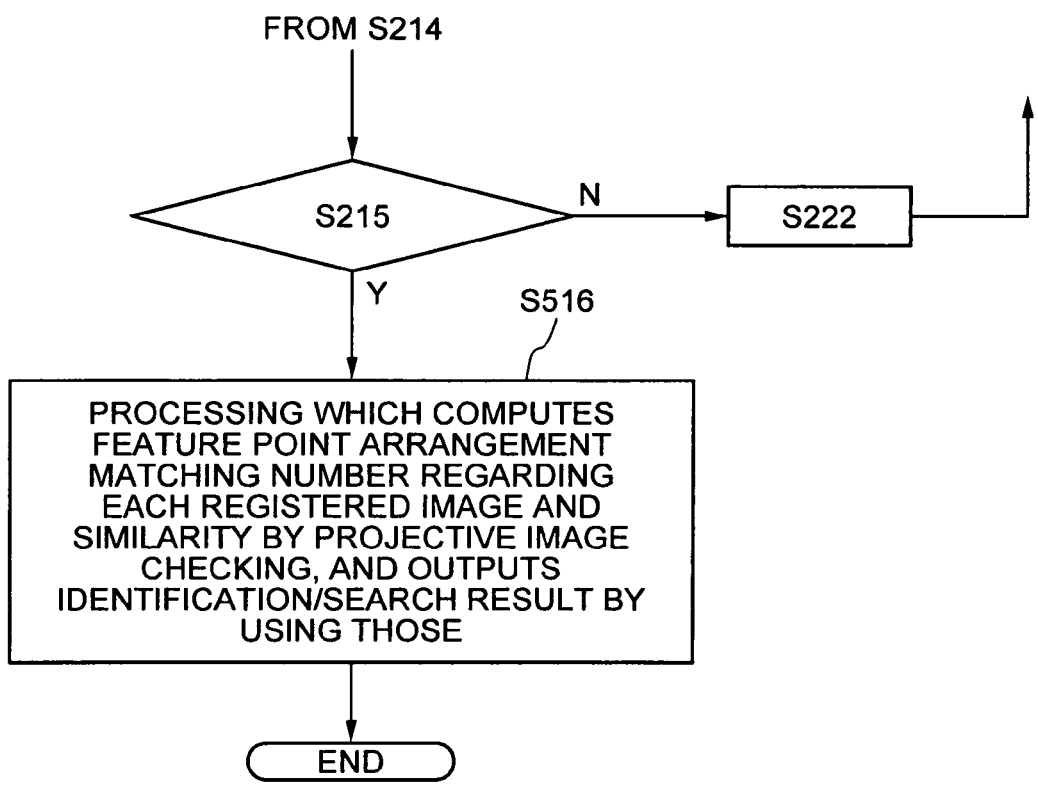
FIG. 31 is a flowchart showing the outline of the operation example of the processing of the thirteenth embodiment in which the feature point checking device of the present invention is applied to the image checking device.
Figure 32:
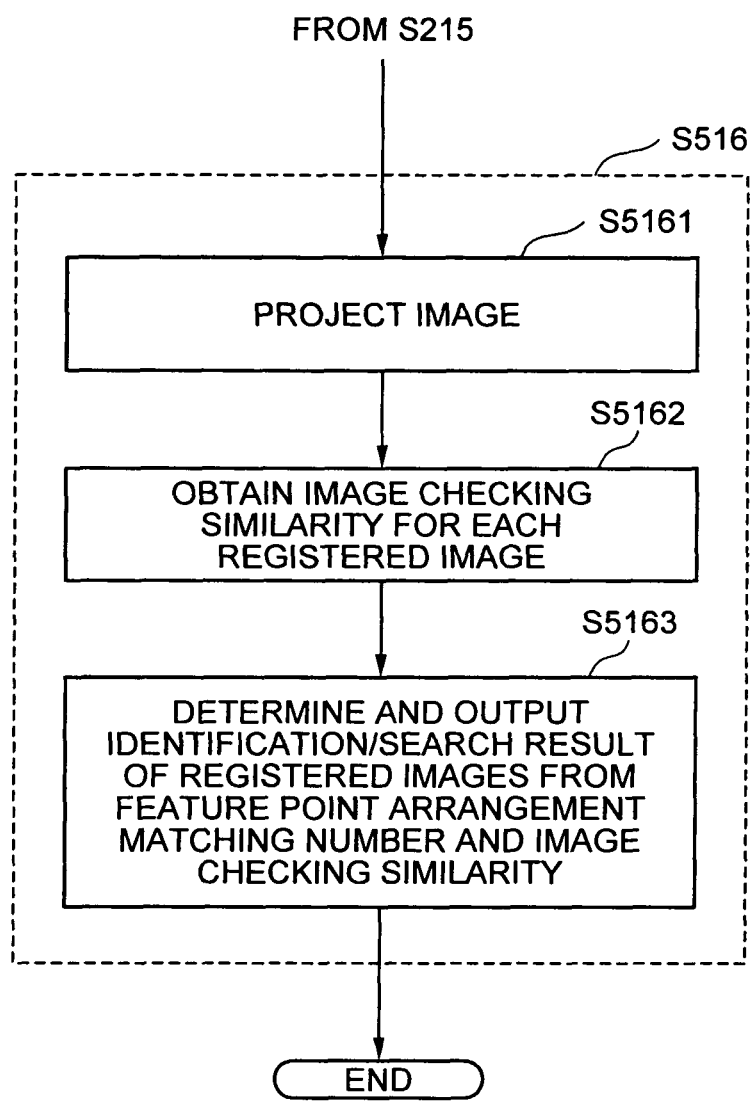
FIG. 32 is another flowchart showing details of an operation example of the processing of the thirteenth embodiment in which the feature point checking device of the present invention is applied to the image checking device.
Figure 33:
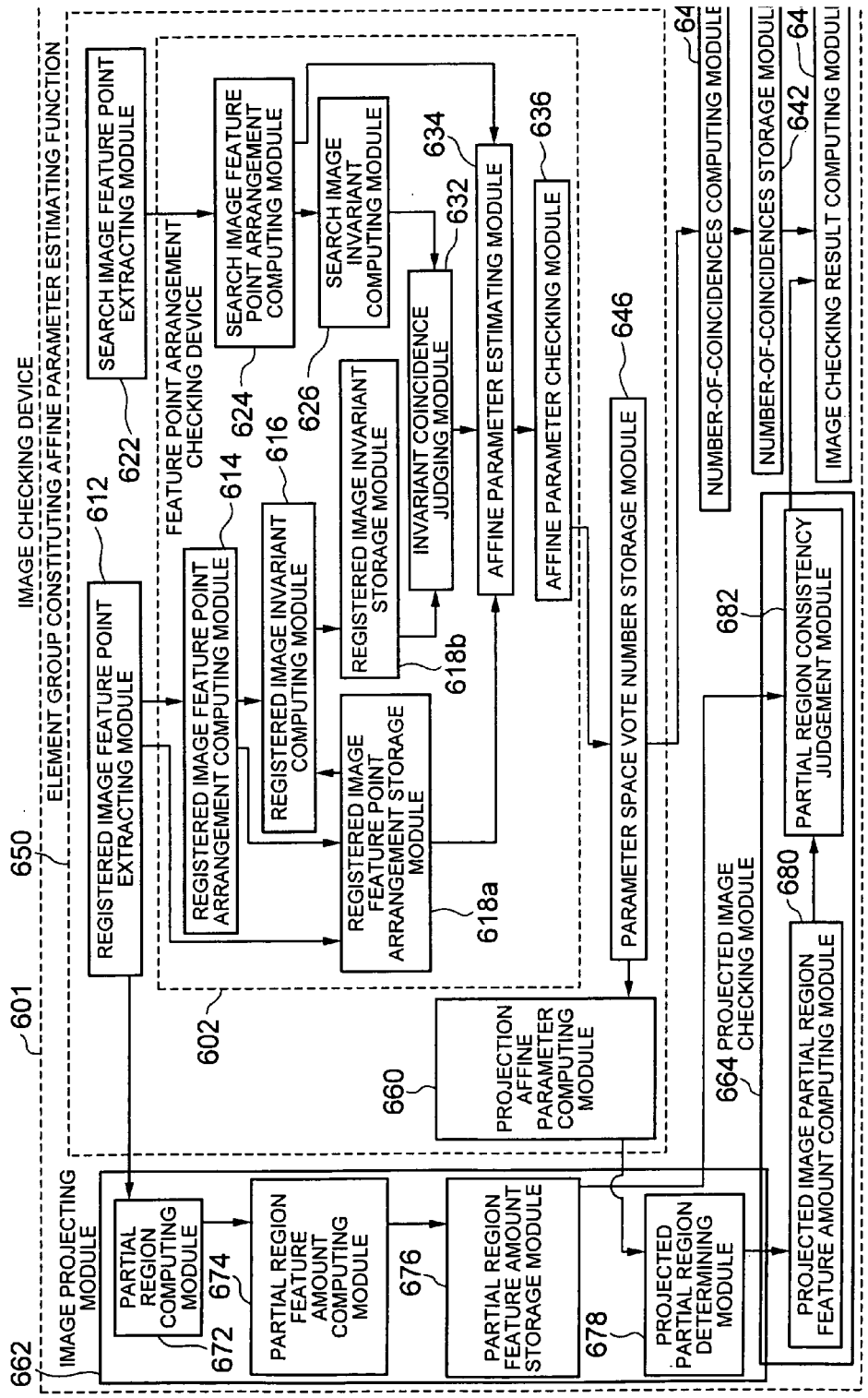
FIG. 33 is a block diagram showing another example of the entire structure of a thirteenth embodiment in which a feature point checking device of the present invention is applied to an image checking device.
Figure 34:
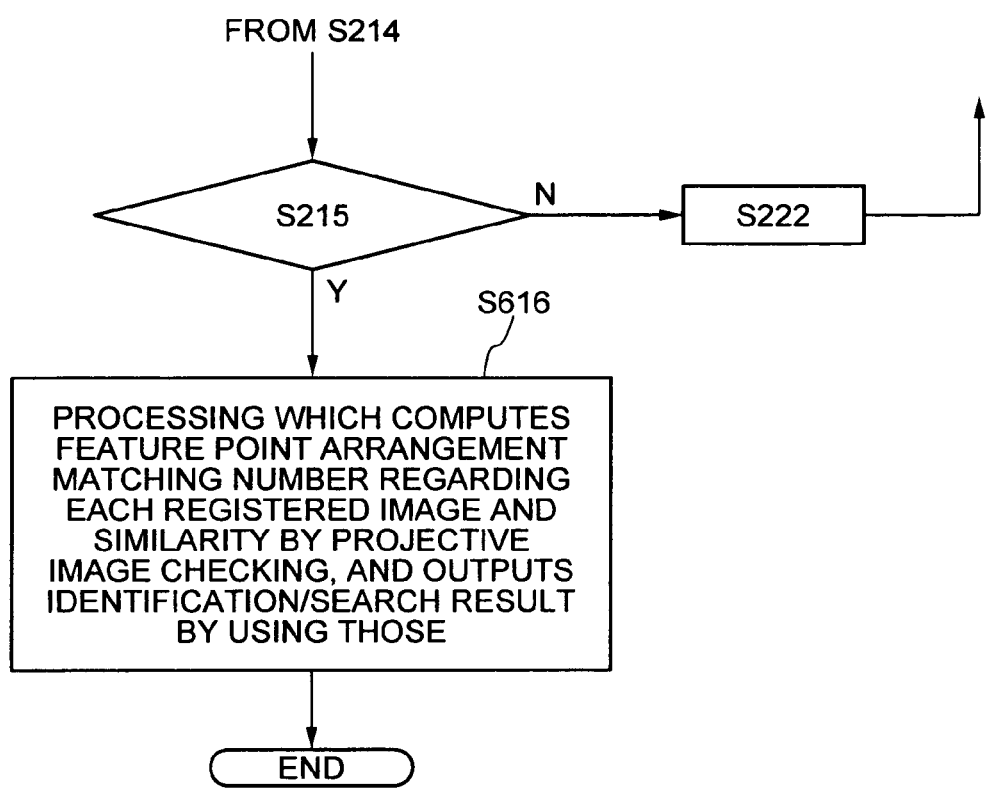
FIG. 34 is a flowchart showing the outline of the operation example of the processing according to another example of the thirteenth embodiment in which the feature point checking device of the present invention is applied to the image checking device.
Figure 35:
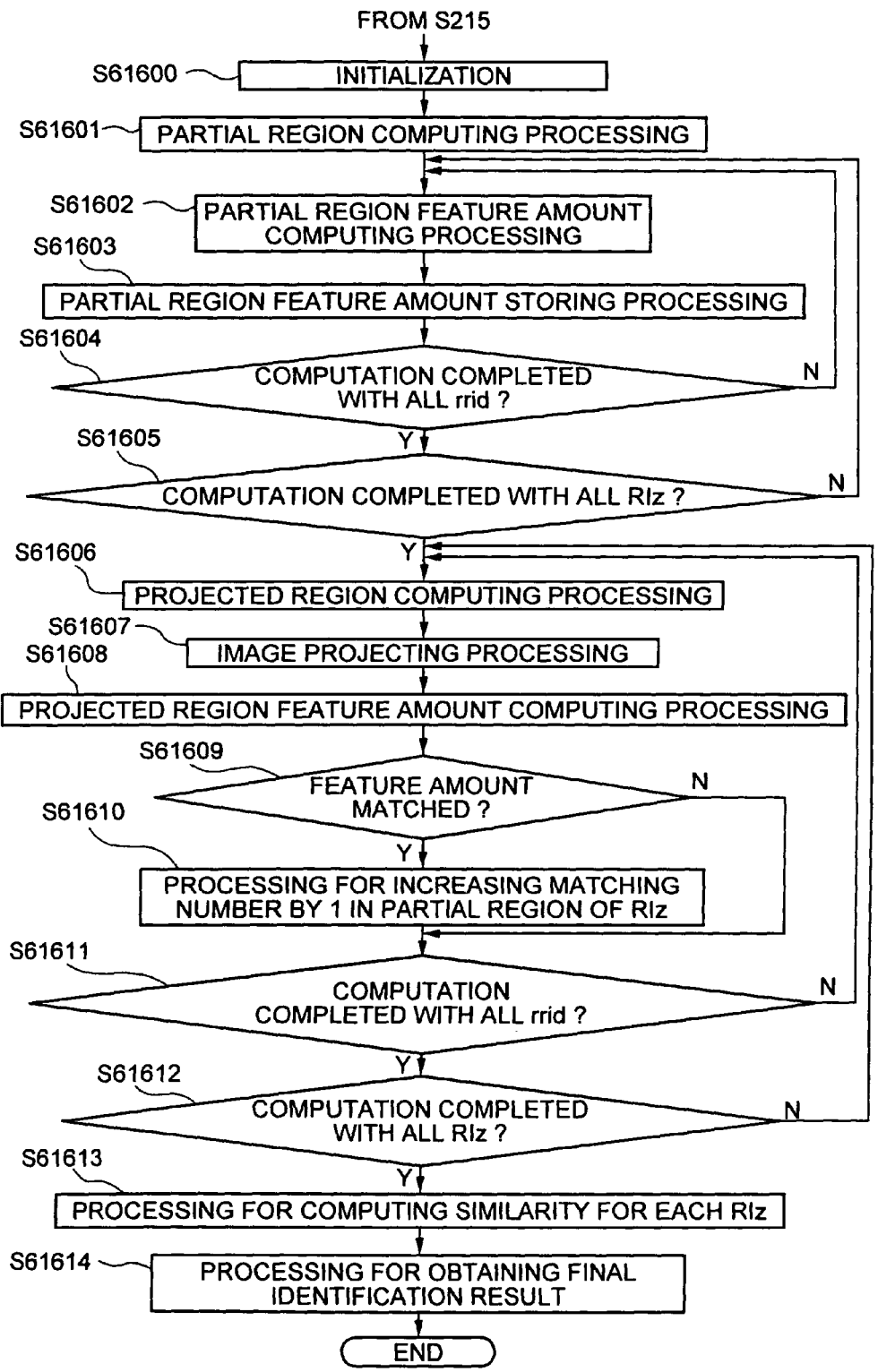
FIG. 35 is a flowchart showing the details of the operation example of the processing according to another example of the thirteenth embodiment in which the feature point checking device of the present invention is applied to the image checking device.
Figure 36:
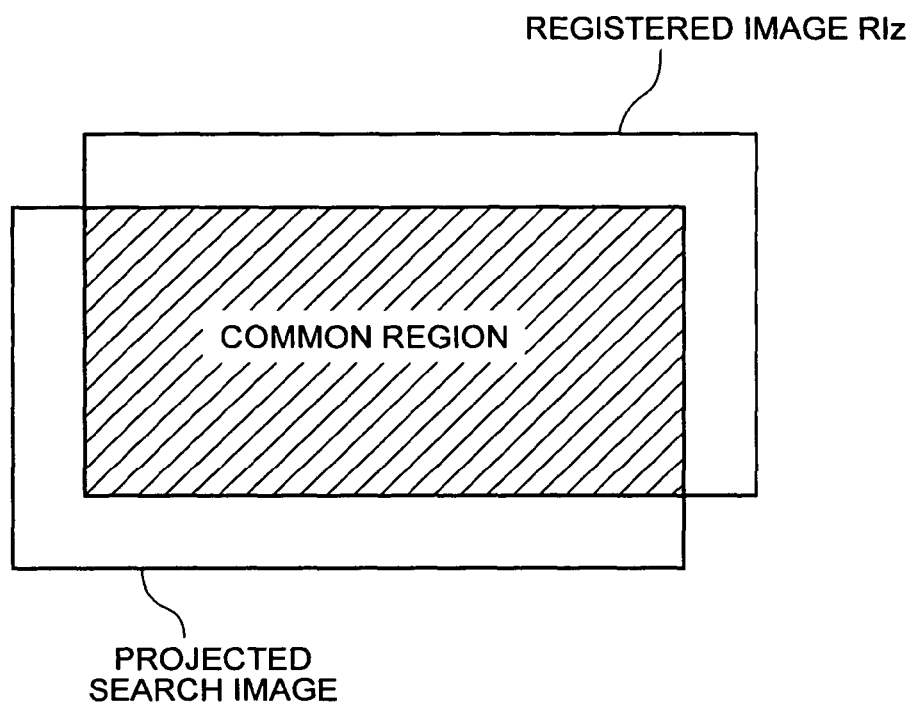
FIG. 36 is an explanatory illustration for describing a common region according to the thirteenth embodiment in which the feature point checking device of the present invention is applied to the image checking device.
Figure 37:
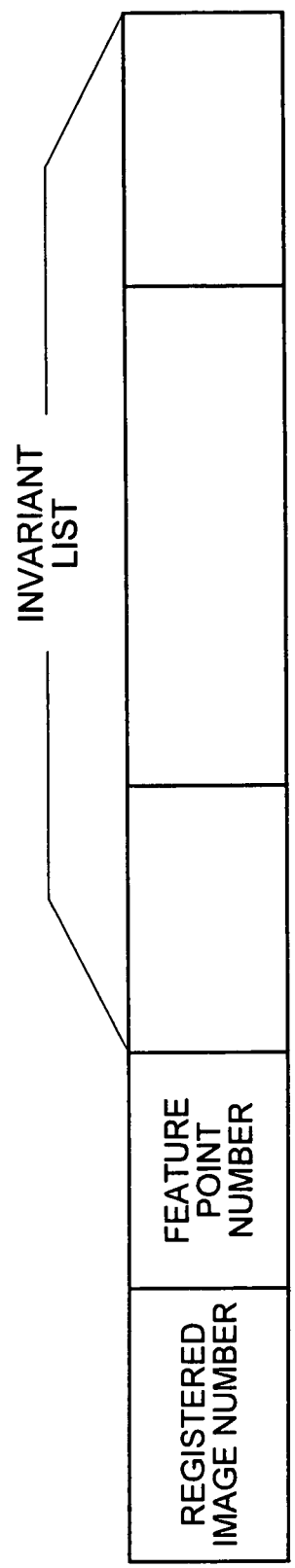
FIG. 37 is a block diagram showing the structure of an image checking device according to an embodiment of the present invention.
Figure 38:
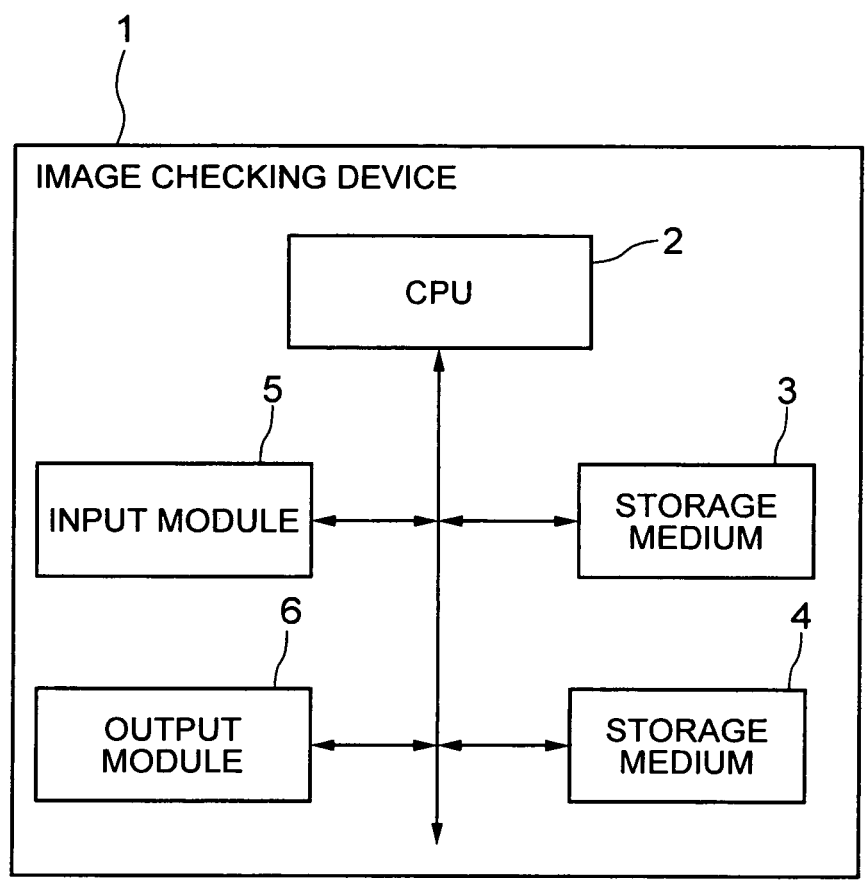
FIG. 38 is an explanatory diagram for describing an example of a feature amount list.

1 Image checking device
10a, 110a, 410a, 510a, 610a Image checking module
10b, 110b, 410b, 510b, 610b Feature point arrangement checking module
12, 112, 412, 512, 612 Registered image feature point extracting module
14, 114, 414, 514, 614 Registered image feature point arrangement computing module
16, 116, 416, 516, 616 Registered image invariant computing module
18a, 118a, 418a, 518a, 618a Registered image feature point arrangement storage module
18a-1 Registered image feature point coordinates storage module
18a-2 Registered image feature point combination storage module
18b, 118b, 418b, 518b, 618b Registered image invariant storage module
22, 122, 422, 522, 622 Search image feature point arrangement extracting module
24, 124, 424, 524, 624 Search image feature point arrangement computing module
26, 126, 426, 526, 626 Search image invariant computing module
32, 132, 432, 532, 632 Invariant coincidence judging module
34, 134, 434, 534, 634 Affine parameter estimating module
36, 136, 436, 536, 636 Affine parameter checking module
42, 142, 442, 542, 642 Number-of-coincidences storage module
44, 144, 444, 544, 644 Image checking result computing module
136 Feature point arrangement coincidence judging module
446, 546, 646 Parameter space vote number storage module
448, 548, 648 Number-of-coincidences computing module
560, 660 Projection affine parameter computing module
562, 662 Image projecting module
564, 664 Projection image checking module
672 Partial region computing module
674 Partial region feature amount computing module
676 Partial region feature amount storage module
678 Partial image projecting module
680 Projection image partial region feature amount computing module
682 Partial region coincidence judging module
RI1 Registered image
RI2 Registered image
RI1, RI2 Registered image
QI Search image

The invention claimed is:

1. A feature point arrangement checking device, which computes arrangements of a plurality of feature points based on feature points acquired from one of a plurality of checking target images and another checking target image of the plurality of checking target images, generates a feature amount having invariants as elements regarding a geometrical transformation for each of the checking target images based on a computed result thereof, and checks whether or not the feature point arrangements of the checking target images are the same feature point arrangements by using the feature point amounts of the checking target images, the feature point arrangement checking device comprising:

a parameter estimating module which computes a geometrical transformation parameter based on the respective feature point arrangements that are bases for generating the respective feature amounts of each of the checking target images for a local feature point arrangement pair; and a parameter checking module which checks whether or not each of the feature point arrangements acquired from said one of the checking target images is the same as a corresponding one of the feature point arrangements acquired from said another checking target image by comparing the parameter computed from said each feature point arrangement and said corresponding feature point arrangement with a range that is set in advance.

2. The feature point arrangement checking device as claimed in claim 1, wherein
the parameter estimating module computes said geometric transformation parameter when checking results of the feature point arrangements using the feature amounts having the invariants as the elements regarding the geometrical transformation are same.

3. The feature point arrangement checking device as claimed in claim 1, wherein
the parameter checking module checks whether or not the feature point arrangements of the checking target images are the same feature point arrangements by adding a similarity of a feature vector pair as the invariants regarding the geometrical transformation to the computed parameter regarding the geometrical transformation.

4. The feature point arrangement checking device as claimed in claim 1, wherein
the geometrical transformation comprises an affine transformation.

5. The feature point arrangement checking device as claimed in claim 1, wherein the parameter checking module judges that a feature point arrangement acquired from the one of the checking target images is the same as one of the feature point arrangements acquired from the another checking target image when the parameter computed from the both feature point arrangements regarding the geometrical transformation is within the range that is set in advance.

6. The feature point arrangement checking device as claimed in claim 1, wherein the parameter checking module:
checks whether or not the parameter computed by the parameter estimating module is within a prescribed range that is set in advance based on specifications of an imaging system for capturing images, and conditions for acquiring the images; and
judges that the feature point arrangements of said one of the checking target images and said another of the checking target images match with each other, when the parameter is within the prescribed range.

7. An image checking device, which computes arrangements of a plurality of feature points based on feature points acquired from one of a plurality of checking target images and another checking target image of the plurality of checking target images, generates a feature amount having invariants as elements regarding a geometrical transformation for each of the checking target images based on a computed result thereof, and judges whether or not the feature point arrangements of the checking target images are the same feature point arrangements by using the feature point amounts of the checking target images so as to check the images, the image checking device comprising:

a parameter estimating module which computes a geometrical transformation parameter based on the respective feature point arrangements that are bases for generating the respective feature amounts of each of the checking target images for a local feature point arrangement pair;

a parameter checking module which checks whether or not each of the feature point arrangements acquired from said one of the checking target images is the same as a corresponding one of the feature point arrangements acquired from said another checking target image by comparing the parameter computed from said each feature point arrangement and said corresponding feature point arrangement with a range that is set in advance; and an image checking result computing module which outputs an image checking result based on a number of feature point arrangements judged as the same by the parameter checking module.

8. The image checking device as claimed in claim 7, wherein the parameter estimating module computes said geometric transformation parameter when checking results of the feature point arrangements using the feature amounts having the invariants as the elements regarding the geometrical transformation are same.

9. The image checking device as claimed in claim 7, wherein the parameter checking module checks whether or not the feature point arrangements of the checking target images are the same feature point arrangements by adding a similarity of a feature vector pair as the invariants regarding the geometrical transformation to the computed parameter regarding the geometrical transformation.

10. The image checking device as claimed in claim 7, wherein the geometrical transformation comprises an affine transformation.

11. The image checking device as claimed in claim 7, further comprising:
a storage module which stores a number of feature point arrangements that are judged as the same by the parameter checking module in regions corresponding to values of the parameter; and
a number-of-coincidences computing module which computes a number of coincidences of the feature point arrangements based on the number of the feature point arrangements stored in each of the regions, and outputs a computed result to the image checking result computing module.

12. The image checking device as claimed in claim 11, further comprising:
an image projecting module which projects one of the checking target images on another of the checking target images; and
a projected image checking module which computes similarity of the projected images,
wherein the image checking result computing module outputs the image checking result by adding the computed similarity to the coincident number of the feature points.

13. The image checking device as claimed in claim 7, wherein the parameter checking module:
checks whether or not the parameter computed by the parameter estimating module is within a prescribed range that is set in advance based on specifications of an imaging system for capturing images, and conditions for acquiring the images; and judges that the feature point arrangements of one of the checking target images and another of the checking target images match with each other, when the parameter is within the prescribed range.

14. A feature point arrangement checking method, which computes arrangements of a plurality of feature points based on feature points acquired from one of a plurality of checking target images and another checking target image of the plurality of checking target images, generates a feature amount having invariants as elements regarding a geometrical transformation for each of the checking target images based on a computed result thereof, and checks whether or not the feature point arrangements of the checking target images are the same feature point arrangements by using the feature point amounts of the checking target images, the feature point arrangement checking method comprising:

computing a geometrical transformation parameter based on the respective feature point arrangements that are bases for generating the respective feature amounts of each of the checking target images for a local feature point arrangement pair; and checking whether or not each of the feature point arrangements acquired from said one of the checking target images is the same as a corresponding one of the feature point arrangements acquired from said another checking target image by comparing the parameter computed from said each feature point arrangement and said corresponding feature point arrangement with a range that is set in advance.

15. The feature point arrangement checking method as claimed in claim 14, further comprising:

checking whether or not the parameter computed by the parameter estimating module is within a prescribed range that is set in advance based on specifications of an imaging system for capturing images, and conditions for acquiring the images; and judging that the feature point arrangements of said one of the checking target images and said another of the checking target images match with each other, when the parameter is within the prescribed range.

16. An image checking method, which computes arrangements of a plurality of feature points based on feature points acquired from one of a plurality of checking target images and another checking target image of the plurality of checking target images, generates a feature amount having invariants as elements regarding a geometrical transformation for each of the checking target images based on a computed result thereof, and judges whether or not the feature point arrangements of the checking target images are the same feature point arrangements by using the feature point amounts of the checking target images so as to check the images, the image checking method comprising:

computing a geometrical transformation parameter based on the respective feature point arrangements that are bases for generating the respective feature amounts of each of the checking target images for a local feature point arrangement pair;

checking whether or not each of the feature point arrangements acquired from said one of the checking target images is the same as a corresponding one of the feature point arrangements acquired from said another checking target image by comparing the parameter computed from said each feature point arrangement and said corresponding feature point arrangement with a range that is set in advance; and outputting an image checking result based on a number of feature point arrangements judged as the same.

17. The image checking method as claimed in claim 16, further comprising:

checking whether or not the parameter computed by the parameter estimating module is within a prescribed range that is set in advance based on specifications of an imaging system for capturing images, and conditions for acquiring the images; and judging that the feature point arrangements of said one of the checking target images and said another of the checking target images match with each other, when the parameter is within the prescribed range.

18. A non-transitory computer readable recording medium storing a feature point arrangement checking program, which controls to compute arrangements of a plurality of feature points based on feature points acquired from one of a plurality of checking target images and another checking target image of the plurality of checking target images, to generate a feature amount having invariants as elements regarding a geometrical transformation for each of the checking target images based on a computed result thereof, and to check whether or not the feature point arrangements of the checking target images are the same feature point arrangements by using the feature point amounts of the checking target images, the feature point arrangement checking program causing a computer to execute:

a function which computes a geometrical transformation parameter based on the respective feature point arrangements that are bases for generating the respective feature amounts of each of the checking target images for a local feature point arrangement pair; and a function which checks whether or not each of the feature point arrangements acquired from said one of the checking target images is the same as a corresponding one of the feature point arrangements acquired from said another checking target image by comparing the parameter computed from said each feature point arrangement and said corresponding feature point arrangement with a range that is set in advance.

19. The non-transitory computer readable recording medium as claimed in claim 18, wherein said feature point arrangement checking program further causes the computer to execute:

a function that checks whether or not the parameter computed by the parameter estimating module is within a prescribed range that is set in advance based on specifications of an imaging system for capturing images, and conditions for acquiring the images; and a function that judges that the feature point arrangements of said one of the checking target images and said another of the checking target images match with each other, when the parameter is within the prescribed range.

20. A non-transitory computer readable recording medium storing an image checking program, which controls to compute arrangements of a plurality of feature points based on feature points acquired from one of a plurality of checking target images and another checking target image of the plurality of checking target images, to generate a feature amount having invariants as elements regarding a geometrical transformation for each of the checking target images based on a computed result thereof, and to judge whether or not the feature point arrangements of the checking target images are the same feature point arrangements by using the feature point amounts of the checking target images so as to check the images, the image checking program causing a computer to execute:

- a function which computes a geometrical transformation parameter based on the respective feature point arrangements that are bases for generating the respective feature amounts of each of the checking target images for a local feature point arrangement pair;
- a function which checks whether or not each of the feature point arrangements acquired from said one of the checking target images is the same as a corresponding one of the feature point arrangements acquired from said another checking target image by comparing the parameter computed from said each feature point arrangement and said corresponding feature point arrangement with a range that is set in advance; and
- a function which outputs an image checking result based on a number of feature point arrangements judged as the same.

21. The non-transitory computer readable recording medium as claimed in claim 20, wherein said image checking program further causes the computer to execute:

- a function that checks whether or not the parameter computed by the parameter estimating module is within a prescribed range that is set in advance based on specifications of an imaging system for capturing images, and conditions for acquiring the images; and
- a function that judges that the feature point arrangements of said one of the checking target images and said another of the checking target images match with each other, when the parameter is within the prescribed range.

* * * * *